(12) United States Patent
Yoon et al.

(10) Patent No.: US 11,353,732 B2
(45) Date of Patent: Jun. 7, 2022

(54) DISPLAY APPARATUS

(71) Applicant: SAMSUNG ELECTRONICS CO., LTD., Suwon-si (KR)

(72) Inventors: Sang Ki Yoon, Suwon-si (KR); Yoon Ah Kim, Suwon-si (KR); Huu Lam Vuong Nguyen, Suwon-si (KR); Kwang Sung Hwang, Suwon-si (KR); Jin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 256 days.

(21) Appl. No.: 16/549,746

(22) Filed: Aug. 23, 2019

(65) Prior Publication Data

US 2020/0064677 A1 Feb. 27, 2020

Related U.S. Application Data

(60) Provisional application No. 62/722,519, filed on Aug. 24, 2018.

(30) Foreign Application Priority Data

Nov. 8, 2018 (KR) .................. 10-2018-0136814

(51) Int. Cl.
*G02F 1/1333* (2006.01)
*H01R 13/62* (2006.01)
*G06F 1/16* (2006.01)

(52) U.S. Cl.
CPC ...... *G02F 1/133308* (2013.01); *G06F 1/1601* (2013.01); *H01R 13/6205* (2013.01)

(58) Field of Classification Search
CPC . G09F 9/3026; G06F 1/1601; H01R 13/6205; G02F 1/133308; G02F 2201/50; G02F 1/13336
See application file for complete search history.

(56) References Cited

U.S. PATENT DOCUMENTS

2016/0210886 A1 7/2016 Brashnyk et al.
2017/0006727 A1* 1/2017 Ryu ..................... G09F 9/33
(Continued)

FOREIGN PATENT DOCUMENTS

EP 3 537 415 A1 9/2019
JP 2017-506368 A 3/2017
(Continued)

OTHER PUBLICATIONS

Communication dated Mar. 13, 2019, issued by the Korean Intellectual Property Office in counterpart Korean Patent Application No. 10-2018-0136814.
(Continued)

*Primary Examiner* — Hoan C Nguyen
(74) *Attorney, Agent, or Firm* — Sughrue Mion, PLLC

(57) ABSTRACT

A display apparatus includes a frame; a display module including at least one substrate on which a plurality of light emitting elements is mounted, and a bracket to which the at least one substrate is attached; and a magnetic coupling device including a holder fastened to the frame and configured to support the display module, and a magnet received in the holder and configured to apply a magnetic attraction force to pull the display module, wherein the holder may
(Continued)

include an adjustment device configured to adjust a position of the display module with respect to the frame while the display module is supported by the frame.

20 Claims, 21 Drawing Sheets

(56) References Cited

U.S. PATENT DOCUMENTS

| | | | | |
|---|---|---|---|---|
| 2018/0031919 A1* | 2/2018 | Ryu | ............... | H01F 7/0252 |
| 2018/0332376 A1* | 11/2018 | Lee | ............... | H04R 7/045 |
| 2019/0179592 A1* | 6/2019 | Hyeon | ............... | G09G 3/006 |
| 2019/0295459 A1* | 9/2019 | Gou | ............... | G09F 9/33 |
| 2020/0063767 A1* | 2/2020 | Jung | ............... | F16B 1/00 |
| 2020/0389987 A1* | 12/2020 | Kanno | ............... | G09F 9/3026 |

FOREIGN PATENT DOCUMENTS

| | | | |
|---|---|---|---|
| JP | 6345380 B1 | | 6/2018 |
| KR | 10-2014-0035739 A | | 3/2014 |
| KR | 10-1541402 B1 | | 8/2015 |
| KR | 10-2018-0011983 A | | 2/2018 |
| WO | 2020/040383 A1 | | 2/2020 |

OTHER PUBLICATIONS

Communication dated Jul. 8, 2019, issued by the Korean Intellectual Property Office in counterpart Korean Patent Application No. 10-2018-0136814.
Communication dated Mar. 11, 2020, issued by the Korean Intellectual Property Office in corresponding Korean Application No. 10-2019-0095500.
Communication dated Aug. 4, 2020, issued by the Korean Intellectual Property Office in Korean Application No. 10-2018-0136814.
International Search Report (PCT/ISA/210) dated Dec. 20, 2019, issued by International Searching Authority in International Application No. PCT/KR2019/010801.
Communication dated Jul. 19, 2021 issued by the European Intellectual Property Office in counterpart European Application No. 19850912.7.
Communication dated Jan. 15, 2022 issued by the Indian Patent Office in Indian Application No. 202117007351.

* cited by examiner

DISPLAY APPARATUS

CROSS-REFERENCE TO RELATED APPLICATION(S)

This application is based on and claims priority under 35 U.S.C. 119 to Korean Patent Application No. 10-2018-0136814, filed on Nov. 8, 2018, in the Korean Intellectual Property Office, and U.S. Provisional Application No. 62/722,519, filed on Aug. 24, 2018, in the U.S. Patent and Trademark Office, the disclosures of which are incorporated by reference herein in their entireties

BACKGROUND

1. Field

The disclosure relates to a display apparatus in which a display module is assembled with a frame, and more particularly to a display apparatus capable of adjusting a position of a display module.

2. Description of Related Art

A display apparatus is a type of output device that visually displays data information such as characters and graphics, and images. Display apparatuses employing a liquid crystal display (LCD) panel and an organic light emitting diode (OLED) panel are widely used.

There is growing need of high luminance, high resolution, large-sized, high-efficiency, and low-power display apparatuses. Therefore, a micro light emitting diode (LED) panel that is manufactured by directly mounting such as an inorganic light emitting diode on a substrate has been researched as a new product to replace or supplement the LCD panel and OLED panel.

The micro LED panel may easily utilize a modular display technology, and the modular display technology is to make a large size screen by generating small sized modules from micro LEDs and tiling a plurality of modules in the vertical and horizontal direction, continuously.

However, as for the application of the modular display technology, the image quality may be deteriorated and a user may feel uncomfortable due to a gap between the modules and a difference in height, between the modules.

SUMMARY

Provided is a display apparatus capable of preventing a difference in height among a plurality of display modules installed in a frame.

Further, provided is a display apparatus capable of eliminating a difference in height among a plurality of display modules without disassembling the display apparatus, after installation of the display apparatus.

Additional aspects will be set forth in part in the description which follows and, in part, will be obvious from the description, or may be learned by practice of the presented embodiments.

In accordance with an aspect of the disclosure, a display apparatus includes a frame; a display module including at least one substrate on which a plurality of light emitting elements is mounted, and a bracket to which the at least one substrate is attached; and a magnetic coupling device including a holder fastened to the frame and configured to support the display module, and a magnet received in the holder and configured to apply a magnetic attraction force to pull the display module, wherein the holder may include an adjustment device configured to adjust a position of the display module with respect to the frame while the display module is supported by the frame.

The display module may be coupled to a front side of the frame, and adjustment device may be configured to adjust a position of the display module with respect to the frame, in a front-rear direction.

The display module may be configured to be moved forward or rearward by rotating the adjustment device clockwise or counterclockwise.

The holder further may include a cylindrical portion having a hollow configured to receive the magnet, and the adjustment device may protrude radially outward from the cylindrical portion.

The holder may include a male thread formed on an outer circumferential surface of the cylindrical portion, and the male thread may be configured to be screwed to the frame.

The adjustment device may include a serrated portion formed at a radially outer end of the adjustment device and, the serrated portion may be configured to have a concave-convex pattern.

At least a part of the adjustment device may be exposed to the outside of the display apparatus.

The bracket may include an edge wall formed on an edge of a back surface of the bracket and configured to protrude toward the frame side, and the bracket may include a slot formed on the edge wall to expose the adjustment device to an outside of the edge wall.

The slot may be recessed from a rear end portion of the edge wall by a predetermined depth.

The display module may be held against the holder by the magnetic attraction force of the magnet.

The bracket may include a bracket body and a stud coupled to the bracket body, and the stud may be configured to magnetically interact with the magnet.

The stud may be held against the holder by the magnetic attraction force between the magnet and the stud while the display module is supported by the frame.

The display apparatus may further include a plurality of magnetic coupling devices positioned at a plurality of corners of the bracket.

The display apparatus may further include a plurality of display modules positioned in a left-right direction or an up-down direction of the display apparatus.

The holder may include a first male thread configured to be screwed to the frame and a second male thread configured to be screwed to the bracket, wherein a pitch of the first male thread may be different from a pitch of the second male thread.

In accordance with an aspect of the disclosure, a display apparatus includes a frame; a display module including at least one substrate on which a plurality of light emitting elements is mounted, and a bracket to which the at least one substrate is attached; a holder fastened to the frame and configured to support the display module; and a magnet configured to attract the display module to the holder by the magnetic attraction force while the display module is supported by the frame, wherein the holder may include a cylindrical portion on which a male thread is formed, wherein the male portion is configured to be screwed into the frame, and the cylindrical portion includes an adjustment device that protrudes radially outward from the cylindrical portion and is configured to adjust a depth to which the holder is inserted into the frame.

At least a part of the adjustment device may be exposed and accessible while the display module is supported by the frame.

At least a part of the adjustment device may extend through a slot formed between the display module and the frame.

The cylindrical portion may include a hollow configured to receive the magnet.

The holder may include a supporter configured to support the display module.

In accordance with an aspect of the disclosure, a display apparatus includes a display module including a magnetizable stud; a frame in which a mounting hole is formed, wherein a first thread is formed on an inner surface of the mounting hole; and a magnetic coupling device including a holder having an outer surface on which second thread is formed, wherein the second thread may be configured to engage the first thread when the holder is inserted into the mounting hole; an adjustment device configured to adjust a depth to which the holder is inserted into the mounting hole by adjusting an amount of engagement between the first thread and the second thread; a magnet disposed within the holder, wherein the magnet may be configured to magnetize the magnetizable stud to attract the magnetizable stud using a magnetic attraction force while the holder is in contact with the magnetizable stud, wherein the holder may be configured to support the display module while the holder is in contact with the magnetizable stud, and wherein the adjustment device may be configured to adjust a position of the display module with respect to the frame while the display module is supported by the frame.

The display module may be configured to be coupled to the frame using a coupling tool, wherein the coupling tool may include a first portion having a first magnetic polarity and a second portion having a second magnetic polarity opposite to the first magnetic polarity, wherein the coupling tool may be configured to magnetize the stud so that the stud attracts the magnet while the first portion is in contact with the display module, and wherein the coupling tool may be configured to magnetize the stud so that the stud repels the magnet while the second portion is in contact with the display module.

BRIEF DESCRIPTION OF THE DRAWINGS

The above and other aspects, features, and advantages of certain embodiments of the present disclosure will become apparent and more readily appreciated from the following description taken in conjunction with the accompanying drawings, in which.

DETAILED DESCRIPTION

Figure 1:
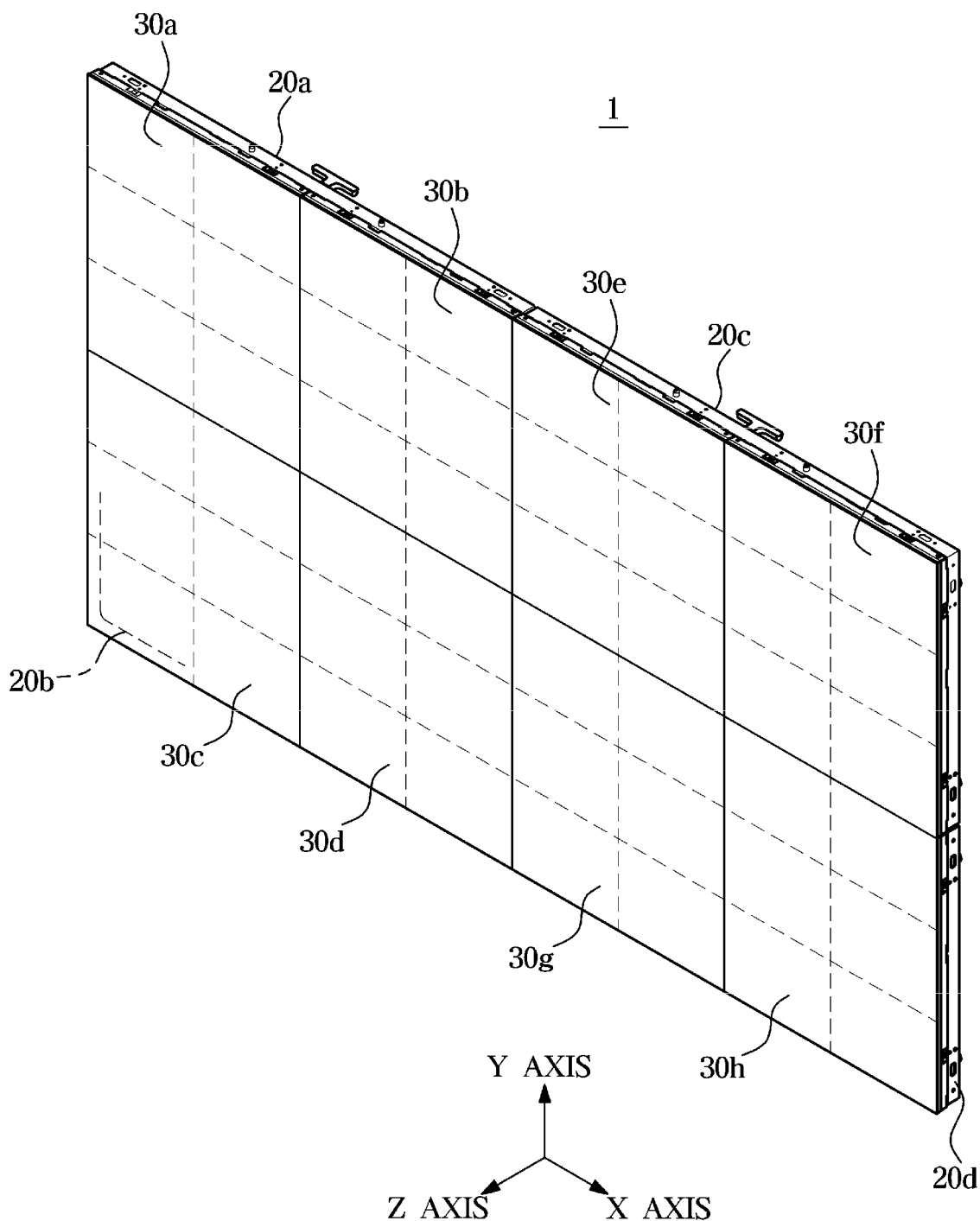
FIG. 1 is a view of a display apparatus according to an embodiment.

Embodiments described in the present disclosure and configurations shown in the drawings are merely examples, and may be modified in various different ways at the time of filing of the present application to replace the embodiments and drawings of the present disclosure.

The singular forms "a," "an" and "the" may be intended to include the plural forms as well, unless the context clearly indicates otherwise. The shape and size of each component illustrated in the drawings may be enlarged for clear expressions In the disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

Reference will now be made in detail to embodiments of the disclosure, examples of which are illustrated in the accompanying drawings.

Figure 2:
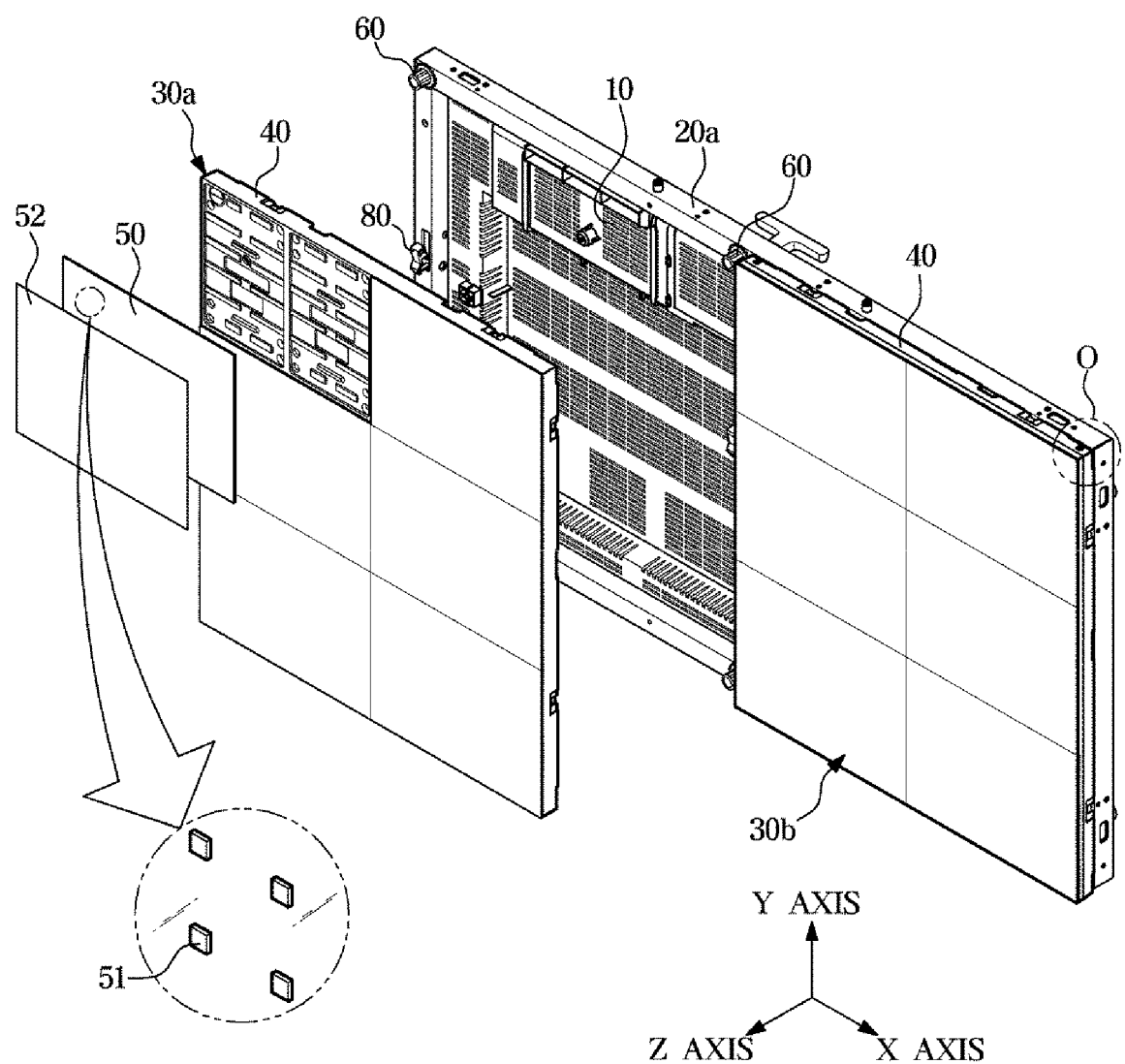
FIG. 2 is a view of a frame and a display module according to an embodiment.

FIG. 1 is a view of a display apparatus according to an embodiment. FIG. 2 is a view of a frame and a display module according to an embodiment. In FIG. 1, X-axis, Y-axis, and Z-axis directions perpendicular to each other are indicated, and the X-axis direction is the left-right direction, the Y-axis direction is the up-down direction, and the Z-axis direction is the front-rear direction.

Hereinafter FIG. 1 and FIG. 2 will be described. A display apparatus 1 is a display apparatus capable of displaying information, materials, and data in the form of characters, graphics and graphs, or any other desired display. The display apparatus 1 may be implemented with an advertisement board, an electric sign board, a screen, a television, and a monitor. The display apparatus may be installed on a wall or a ceiling, or may be installed on the ground by a stand, either indoors or outdoors.

The display apparatus 1 may include a plurality of display modules 30 including display module 30a, display module 30b, display module 30c, display module 30d, display module 30e, display module 30f, display module 30g, and display module 30h, configured to display a plurality of screens, and a plurality of frames 20 including frame 20a, frame 20b, frame 20c, and frame 20d coupled to the rears of the plurality of display modules 30a to 30h to support the plurality of display modules 30a to 30h. Each of the plurality of display modules 30a to 30h may correspond to a display module 30 discussed below, and each of the plurality of frames 20a to 20d may correspond to a frame 20 discussed below.

Each display module 30 may include a substrate 50 and a bracket 40 to which the substrate 50 is attached. Although six substrates 50 are attached to one bracket 40 according to an embodiment, the number of the substrates 50 attached to the bracket 40 is not limited thereto. For example, in an embodiment, a single substrate 50 may be attached to a single bracket 40, or a different number of substrates 50 may be attached to a single bracket 40. The substrate 50 may be attached to the front surface of the bracket 40 through an adhesive or a double-sided adhesive tape.

A plurality of light emitting elements 51 may be mounted on the substrate 50 and a protective member 52 may be provided on the substrate 50 to protect the light emitting element 51 or to improve optical performance.

The substrate 50 may be formed of glass, polyimide (PI), or FR4. A black layer may be formed on the entire surface of the substrate 50 to absorb external light to improve contrast.

A plurality of light emitting elements 51 may include a red light emitting diode (LED), a green LED and a blue LED, and the red LED, the green LED, and the blue LED correspond to a sub-pixel. The plurality of light emitting elements 51 may be apart from each other at a certain distance, and the distance among the plurality of light emitting elements 51 may vary according to the resolution and size of the display apparatus 1.

The plurality of light emitting elements 51 may be formed of an inorganic material and may include a micro-LED having a width of several micrometers (μm) to several hundreds of micrometers (μm) and a length of several micrometers (μm) to several hundreds of micrometers (μm). The plurality of light emitting elements 51 may be picked up from a silicon wafer and transferred directly onto the substrate 50.

The protective member 52 may be formed of a transparent or fluorescent material such as an acrylic resin, a polyimide resin, an epoxy resin, or a polyurethane resin, and may be formed to cover the plurality of light emitting elements 51 mounted on the substrate 50.

In this embodiment, the display apparatus 1 includes four frames 20a to 20d and eight display modules 30a to 30h. However, the number of frames and the number of display modules are not limited thereto.

The display modules 30a to 30h may be arranged adjacent to each other in the up-down direction (Y-axis direction) and/or the left-right direction (X-axis direction). That is, the display modules 30a to 30h may be arranged in an M*N matrix form. In this embodiment, the eight display modules 30a to 30h are arranged in the form of a 4*2 matrix.

At least one display module 30 may be coupled to a single frame 20. According to an embodiment of disclosure, two display modules 30 are coupled to the single frame 20 in the left and right side, but is not limited thereto.

Figure 4:
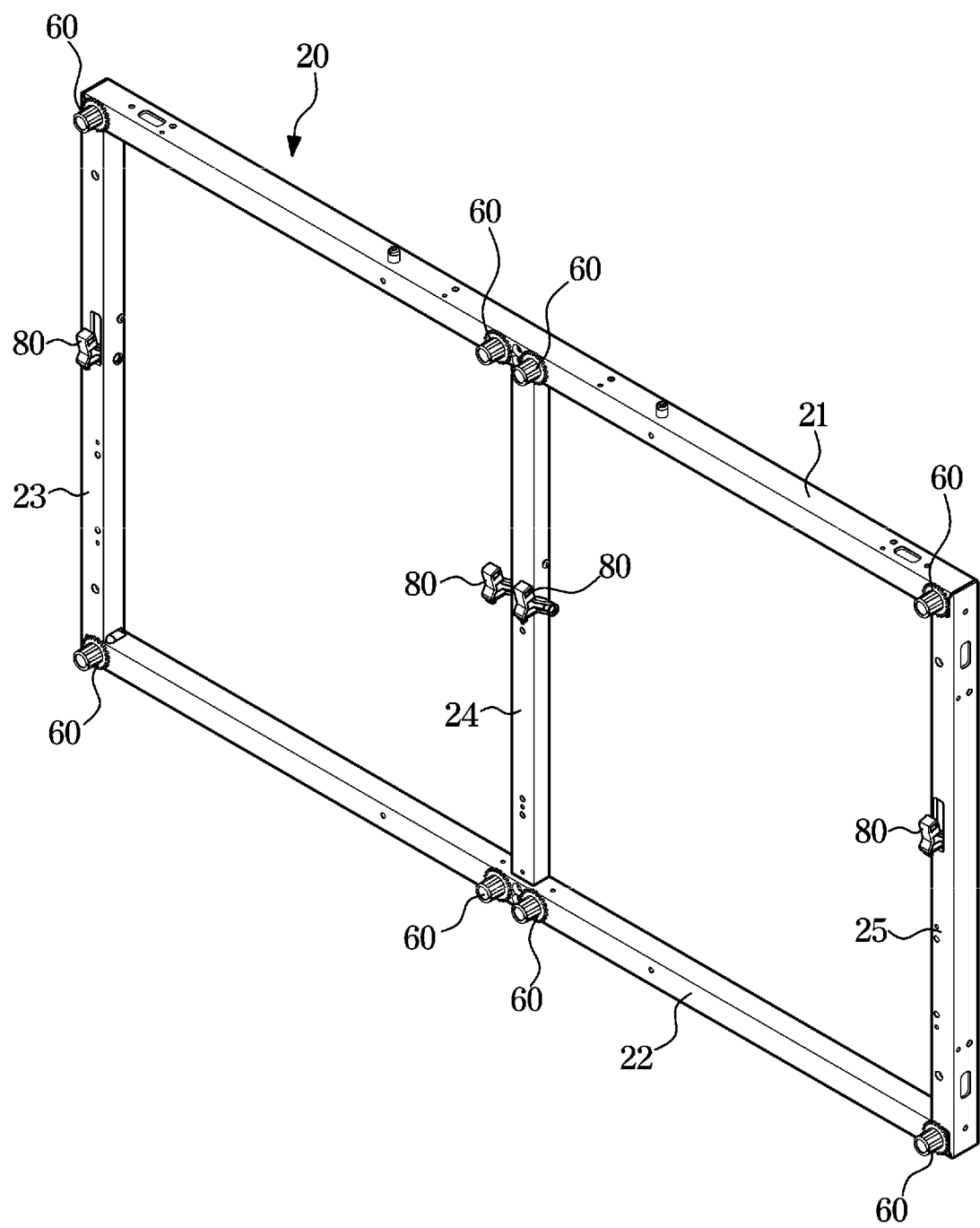
FIG. 4 is a view of the frame according to an embodiment.

The frame 20 may be formed in a rectangular frame shape. That is, as shown in FIG. 4, the frame 20 may include an upper horizontal frame 21, a lower horizontal frame 22, a left vertical frame 23, and a right vertical frame 25 and may have a rectangular frame shape. The frame 20 may further include a middle vertical frame 24 vertically formed to connect the upper horizontal frame 21 and the lower horizontal frame 22.

The display module 30 may be coupled to the frame 20 through a magnetic coupling device 60. The magnetic coupling device 60 may include a magnet, and the magnetic coupling device 60 may tightly couple the display module 30 to the frame 20 by the magnetic force of the magnet. An example of the magnetic coupling device 60 will be described in greater detail below.

The display apparatus may include a rear cover 10 coupled to the rear of the frame 20 to cover the rear of the display apparatus 1. A control board configured to drive the plurality of display modules 30a to 30h and a power supplier configured to supply power to the plurality of display modules 30a to 30h may be disposed between the display modules 30 and the rear cover 10.

FIG. 2 includes a latch 80 configured to prevent the display module 30 from being separated from the frame 20.

Figure 3:
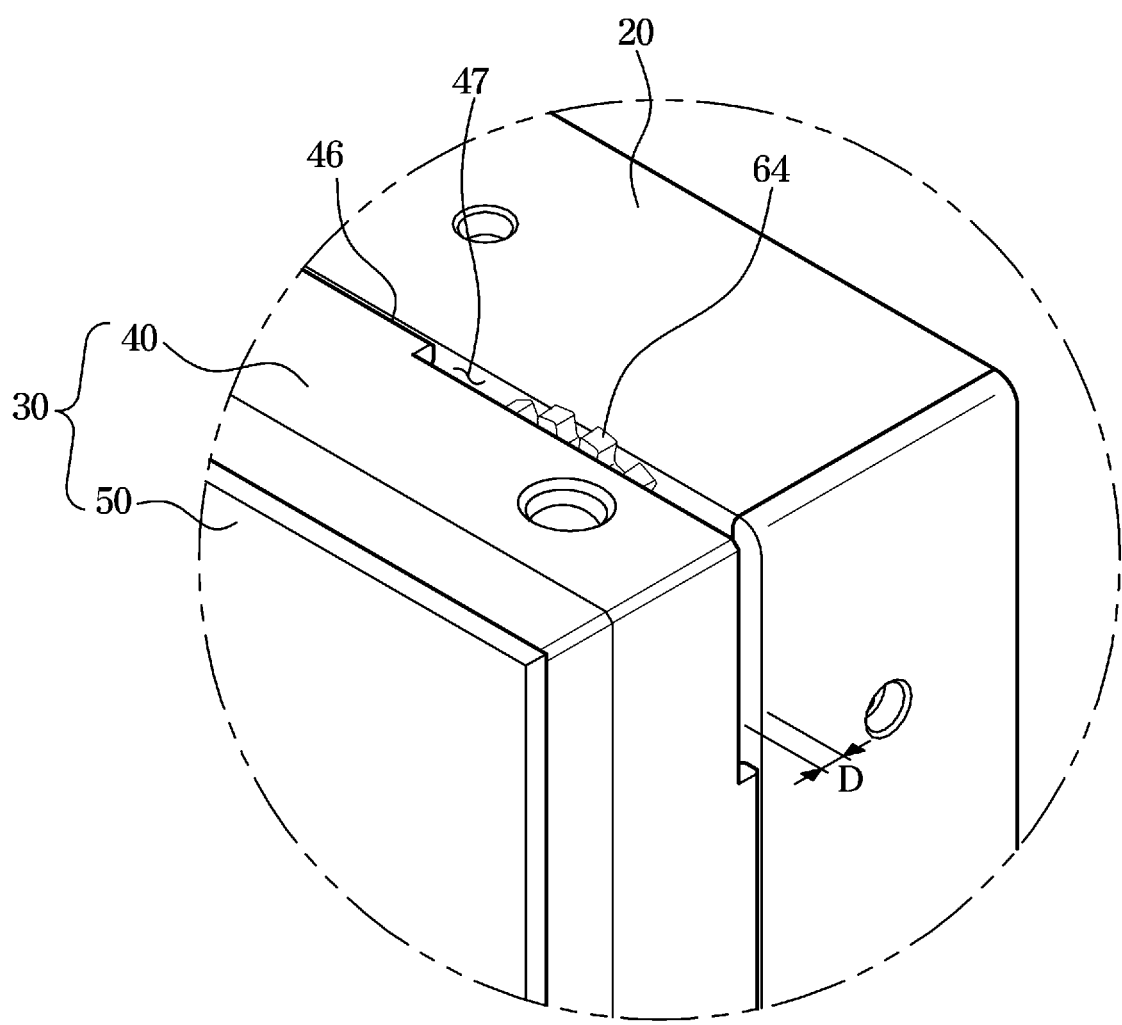
FIG. 3 is an enlarged view of a portion 'O' of FIG. 2.
Figure 5:
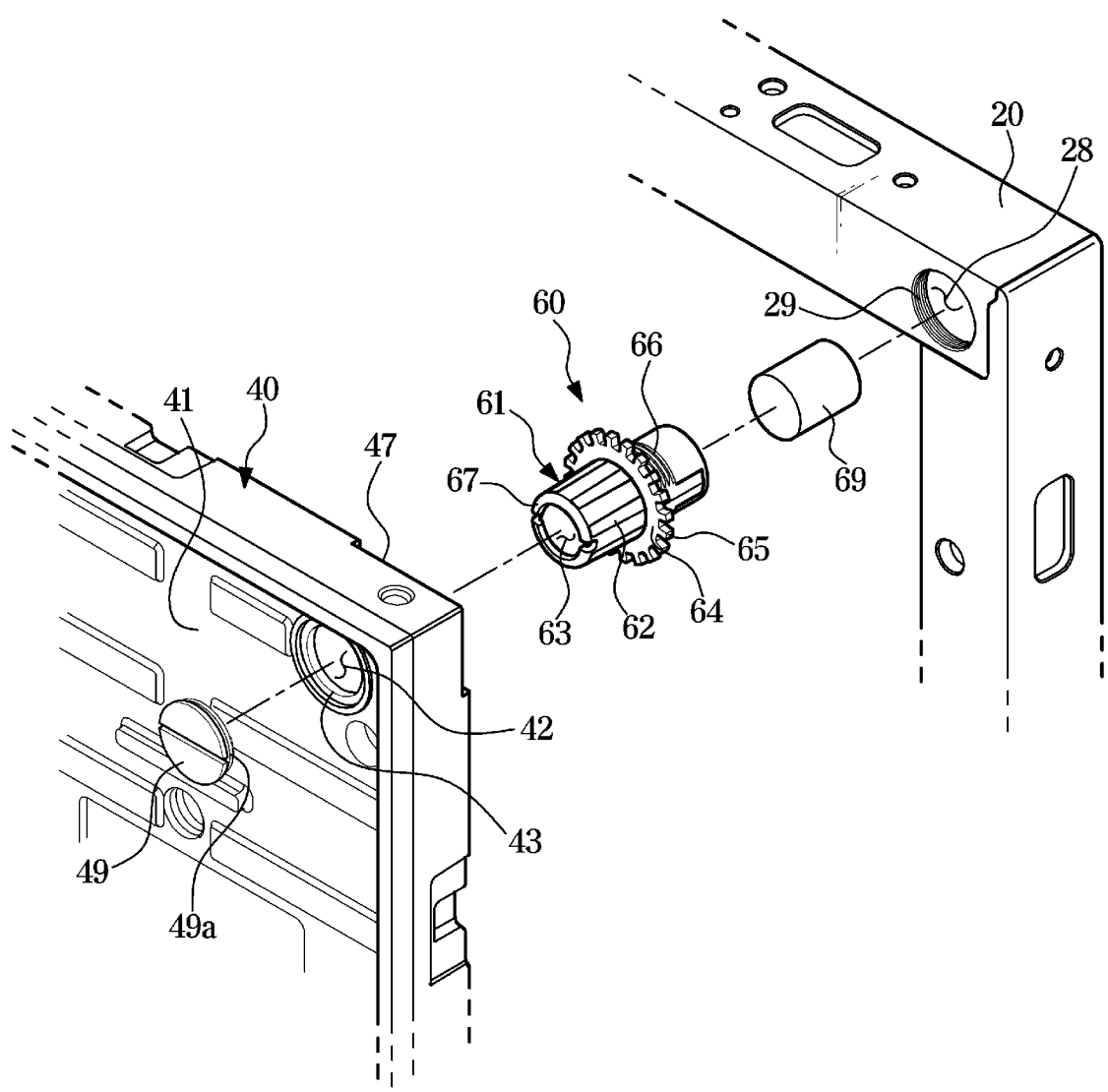
FIG. 5 is a view of a structure in which the frame and the display module are coupled through a magnetic coupling device according to an embodiment.
Figure 6:
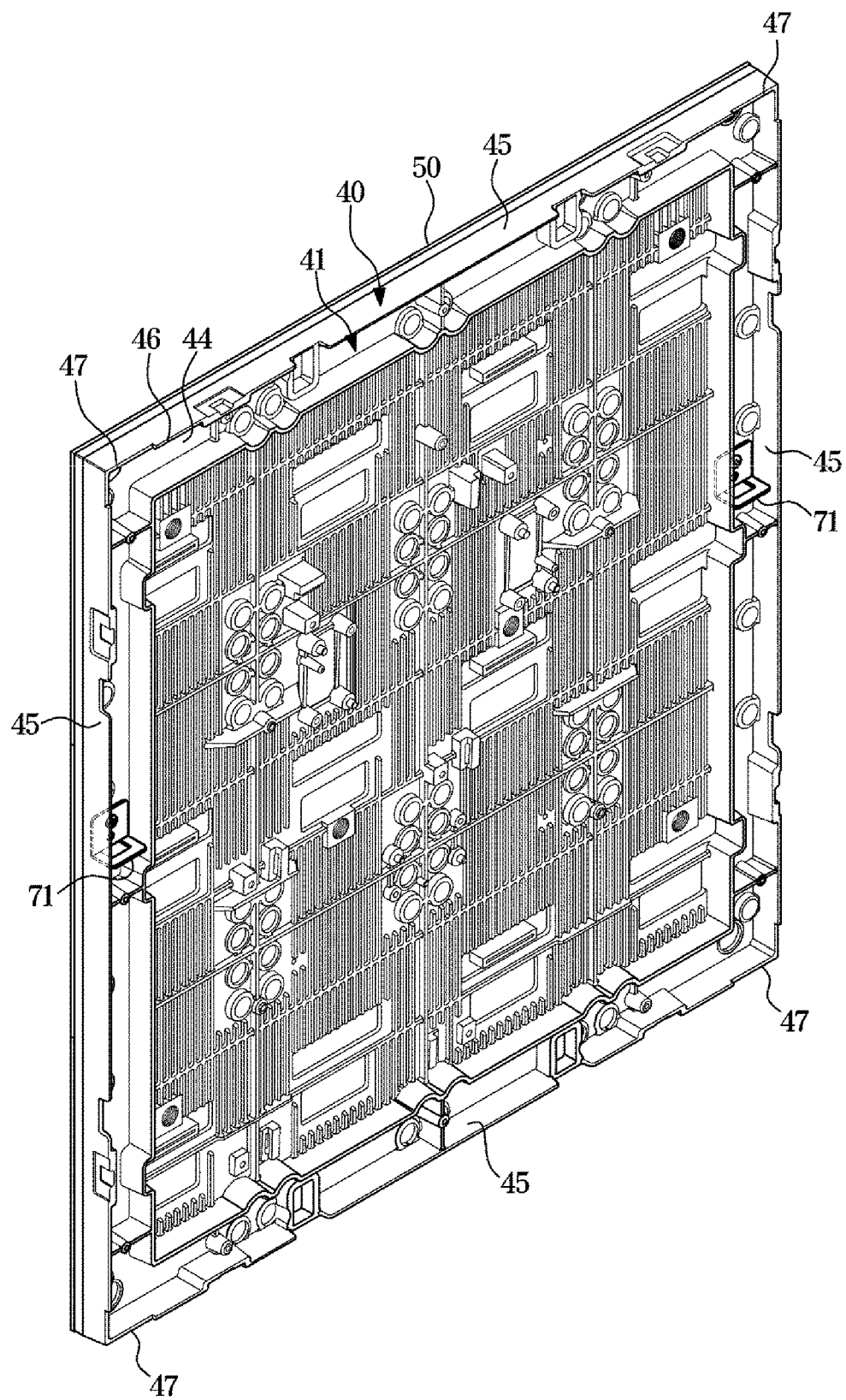
FIG. 6 is a rear perspective view of the display module according to an embodiment.
Figure 7:
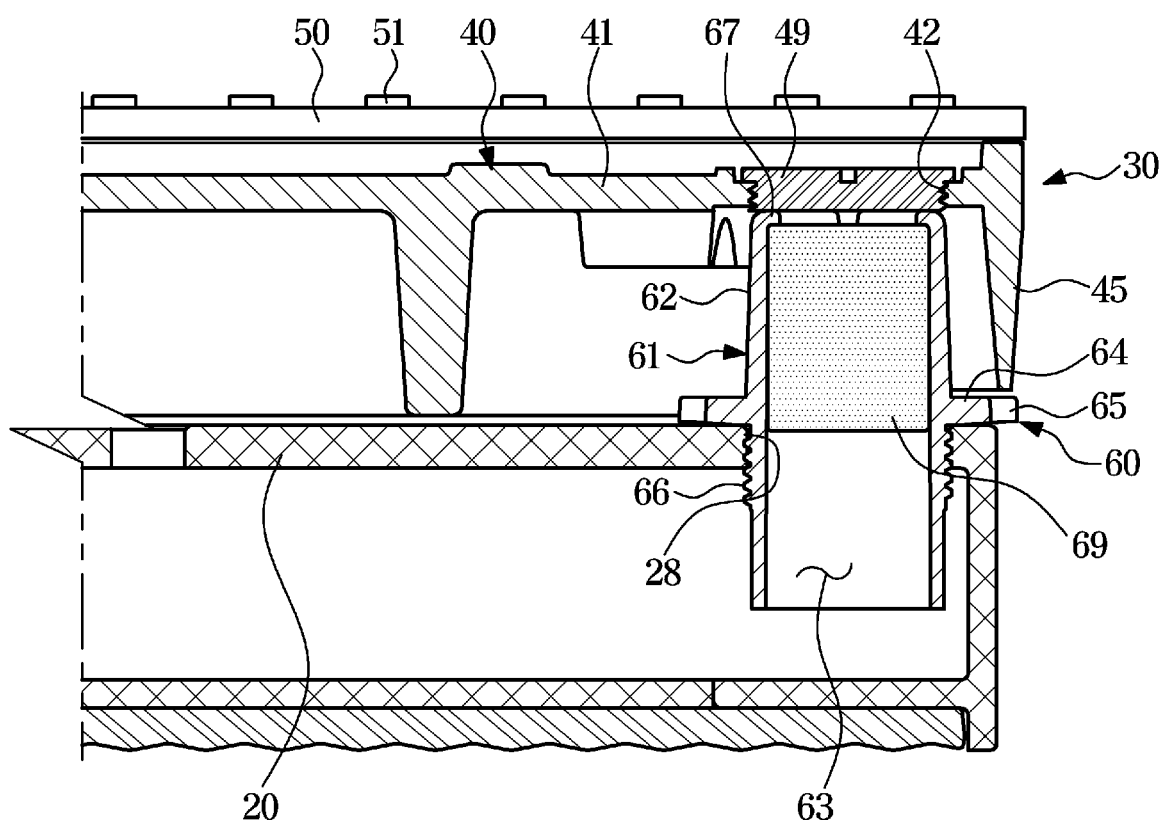
FIG. 7 is a cross-sectional view illustrating a state in which the frame and the display module are coupled through the magnetic coupling device according to an embodiment.

FIG. 3 is an enlarged view of a portion 'O' in FIG. 2. FIG. 4 is a view of the frame according to an embodiment. FIG. 5 is a view of a structure in which the frame and the display module are coupled through a magnetic coupling device according to an embodiment. FIG. 6 is a rear perspective view of the display module according to an embodiment. FIG. 7 is a cross-sectional view illustrating a state in which the frame and the display module are coupled through the magnetic coupling device according to an embodiment.

Hereinafter FIGS. 3, 4, 5, 6, and 7 will be described. The magnetic coupling device 60 may couple a display module 30 to the frame 20 by the magnetic force of the magnet. Particularly, by using the magnetic attraction force, the magnetic coupling device 60 may pull the display module 30 toward the frame and secure the display module 30 to the frame 20.

The magnetic coupling device 60 may include a magnet 69, and a holder 61 configured to receive the magnet 69 and coupled to the frame 20. The holder 61 may be screwed to the frame 20. For this, the holder 61 may include a cylindrical portion 62 having a hollow 63 configured to receive the magnet 69, and a male thread 66 formed on an outer circumferential surface of the cylindrical portion 62 to be screwed to the frame 20.

A holder mounting hole 28 to which the holder 61 is inserted and installed may be formed in the frame 20, and on an inner circumferential surface of the holder mounting hole 28, a female thread 29 to which the male thread 66 is screwed may be formed.

The magnet 69 may be a permanent magnet. For example, magnet 69 may be a soft plastic magnet, a neodymium magnet or a ferrite magnet. There is no limitation in the shape of the magnet 69, and the magnet 69 may be movably placed in the hollow 63.

A supporter 67 configured to closely support the display module 30 may be formed at one end of the cylindrical portion 62 of the holder 61. Particularly, the supporter 67 may closely support a stud 49, an example of which is described in greater detail below. The magnet 69 may be not in contact with the stud 49 by the supporter 67.

The bracket 40 may include a plate-shaped bracket body 41 configured to support the substrate 50, and the stud 49 coupled to the bracket body 41 to interact with the magnet 69 of the magnetic coupling device 60.

The stud 49 may be formed of a material that is magnetizable by an external magnetic force. The stud 49 may be magnetized and then interacted with the magnet 69 of the magnetic coupling device 60. That is, the stud 49 and the magnet 69 of the magnetic coupling device 60 may attract each other or push each other by the polarity of the stud 49 obtained by the external magnetic force.

According to an embodiment, the stud 49 may have a button shape having an approximate thickness corresponding to a thickness of the bracket body 41. The shape of the stud 49 is not limited to the button shape. The stud 49 may be screwed to the bracket body 41. On the outer circumferential surface of the stud 49, a male thread 49a may be formed.

A stud mounting hole 42 to which the stud 49 is inserted and installed may be formed in the bracket body 41, and on an inner circumferential surface of the stud mounting hole 42, a female thread 43 to which the male thread 49a is screwed may be formed.

A plurality of magnetic coupling devices 60 having the above-described structure may be provided. The magnetic coupling devices 60 may be placed at corners of the bracket 40. However, a number and position of the magnetic coupling device 60 are not limited.

The holder 61 may further include an adjustment device 64 configured to adjust the position of the display module 30 with respect to the frame 20.

The adjustment device 64 may adjust the position of the display module 30 with respect to the frame 20 in the front-rear direction, for example the Z-axis direction as illustrated.

The adjustment device 64 may adjust the position of the of the display module 30, which is tightly supported by the holder 61, with respect to the frame 20 in the front-rear direction, by adjusting a depth of the screw connection, or an amount of screw engagement, between the holder 61 and the frame 20. By rotating the adjustment device 64, the holder 61 may be rotated and thus the depth of the screw connection of the holder 61 may be adjusted. That is, by rotating the adjustment device 64 clockwise or counterclockwise, the display module 30 may be moved slightly forward or backward with respect to the frame 20.

Because the difference in the position of the plurality of display modules 30 of the display apparatus 1 is generated in the front-rear direction, the image quality may be deteriorated and a user may feel uncomfortable. However, the degradation in the image quality or the user discomfort may be relieved if, for example each position of a plurality of display modules, for example display modules 30a to 30h, is adjusted to be similar or identical to each other in the front-rear direction by using the adjustment device 64.

The adjustment device 64 may be formed to protrude radially outward from the cylindrical portion 62 of the holder 61. The adjustment device 64 may be formed along the circumference of the outer circumferential surface of the cylindrical portion 62. At the radially outer end of the adjustment device 64, a serrated portion 65 having a concave-convex pattern may be formed to easily rotate the adjustment device 64. In order to rotate the adjustment device 64 through an adjustment tool 120, the serrated portion 65 may be engaged with the adjustment tool 120, an example of which is described in greater detail below.

At least a part of the adjustment device 64 may be exposed to the outside of the display apparatus 1 and thus it is possible to access to the adjustment device 64 without disassembling the display apparatus 1, after the installation of the display apparatus 1.

The bracket 40 may include an edge wall 45 protruding rearward from the upper, lower, left, and right edges of the bracket body 41, and a slot 47 may be formed at a rear end portion 46 of the edge wall 45 to expose the adjustment device 64. The slot 47 may be formed to be recessed from the rear end portion 46 of the edge wall 45 by a predetermined depth D, and at least a part of the adjustment device 64 may be exposed to the outside through the slot 47.

Referring to FIG. 6, a catch 71 is formed on the back surface 44 of the bracket 40 and configured to prevent the display module 30 from being inadvertently separated from frame 20.

Figure 8:
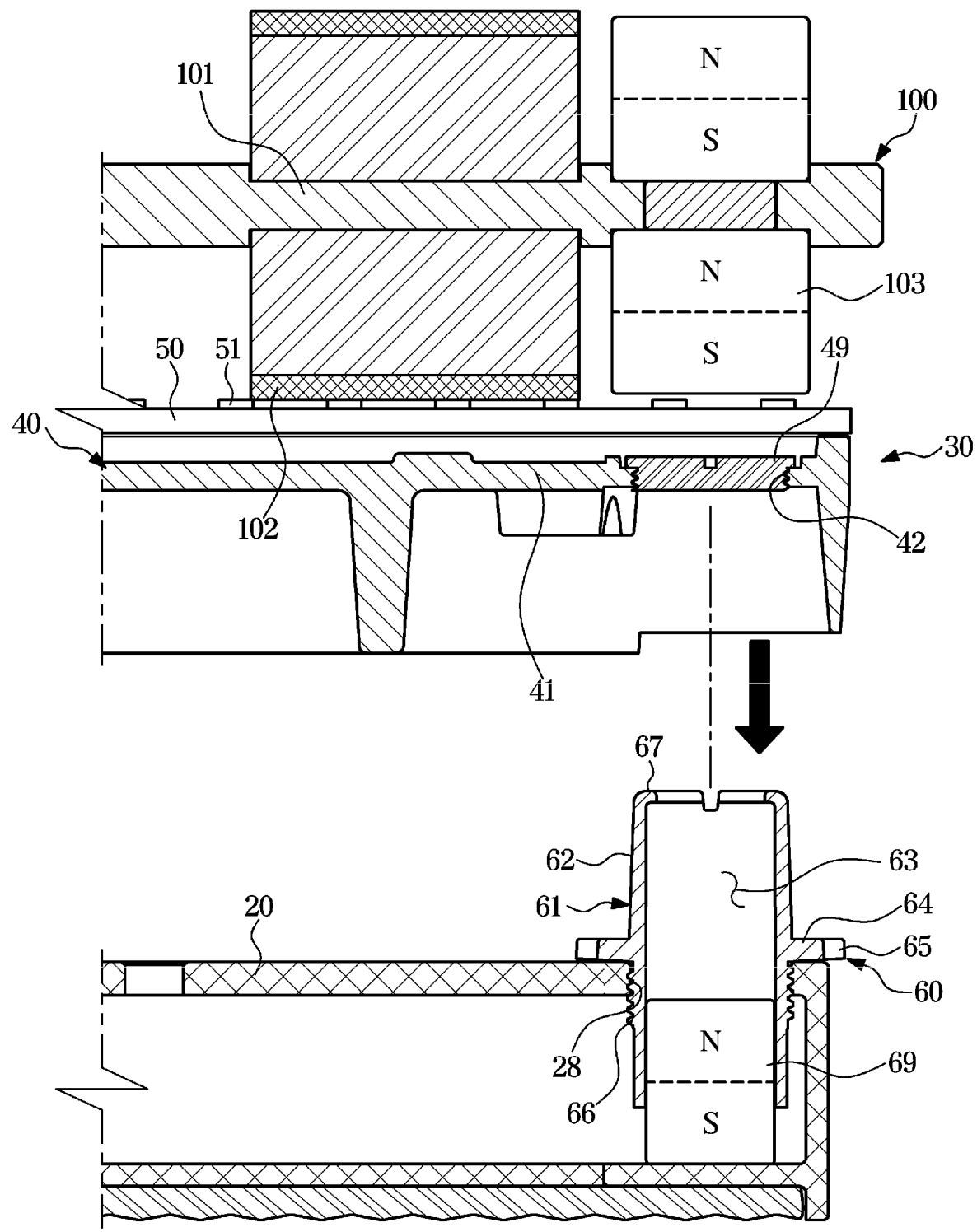
FIGS. 8, 9, and 10 are views illustrating an operation in which the frame and the display module are coupled to each other according to an embodiment.
Figure 9:
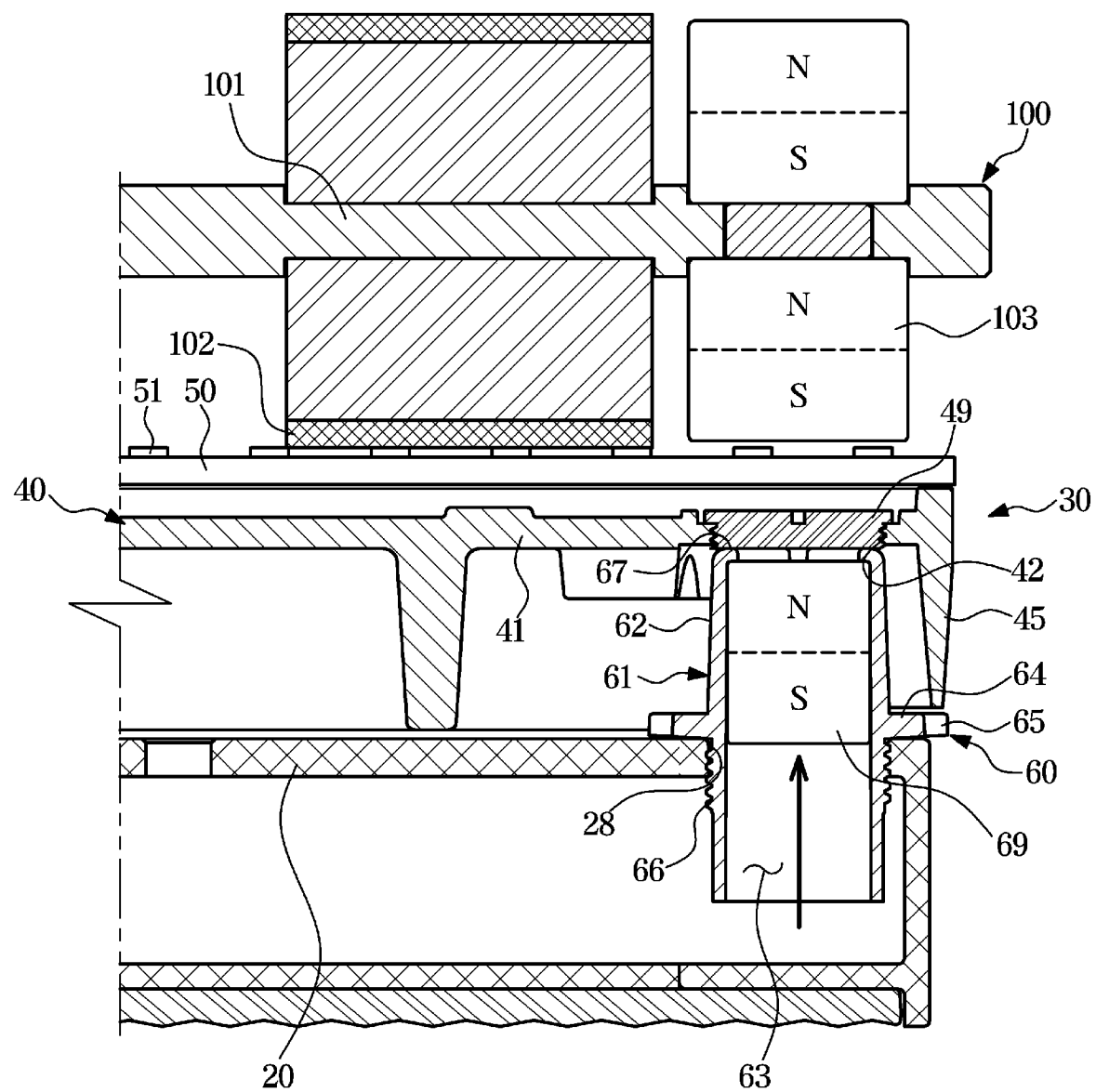
Figure 10:
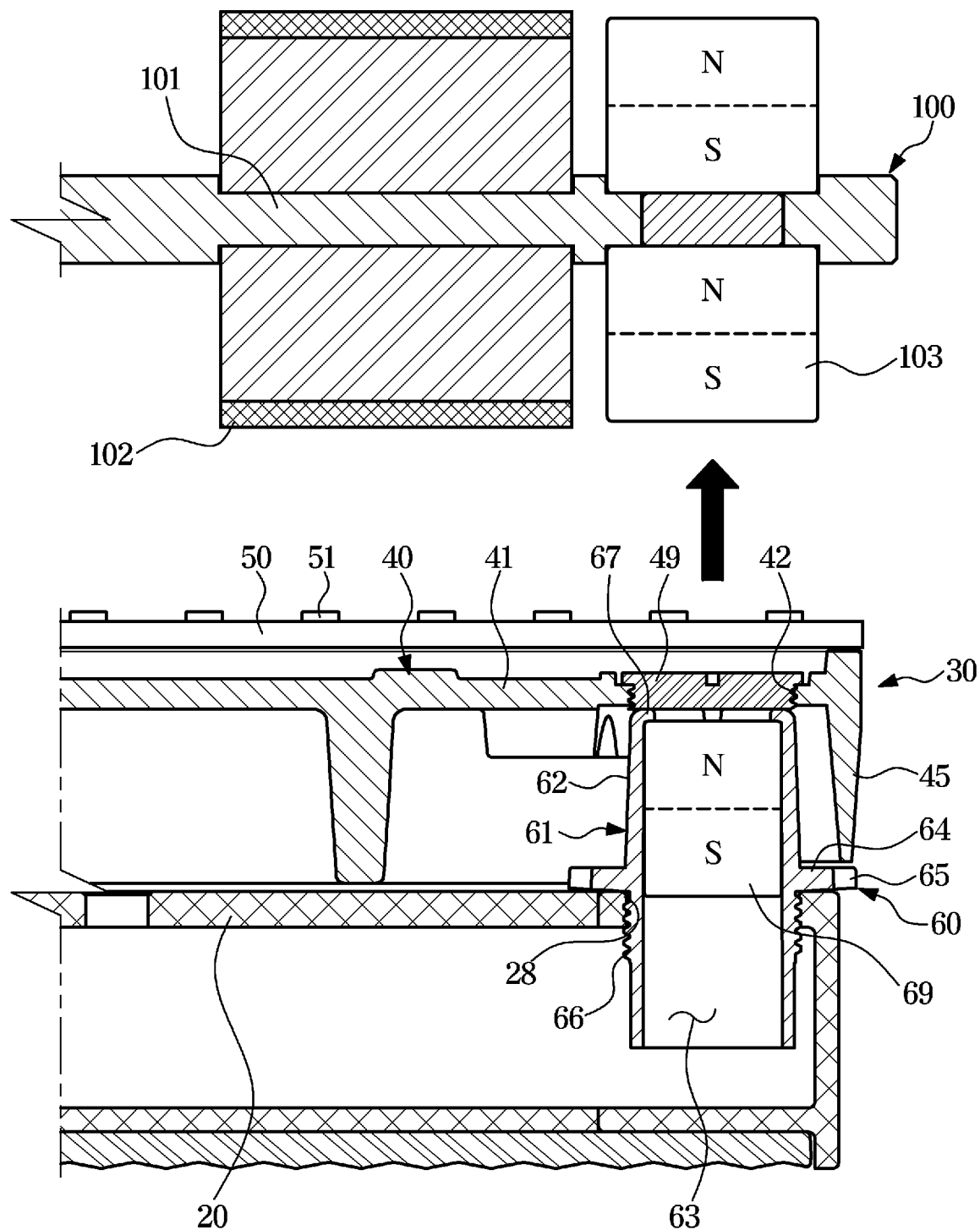
Figure 11:
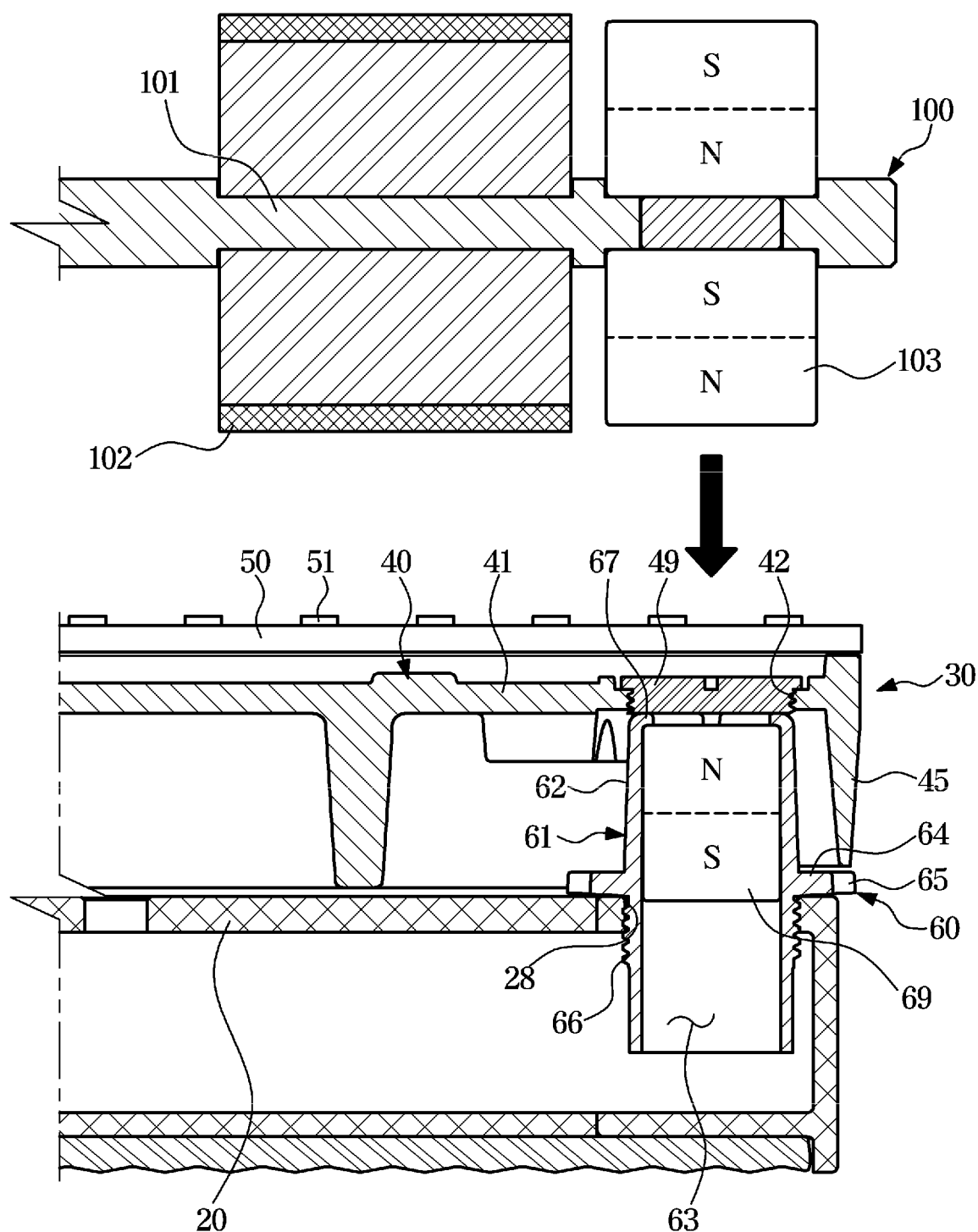
FIGS. 11, 12, and 13 are views illustrating an operation in which the frame and the display module are separated from each other according to an embodiment.
Figure 12:
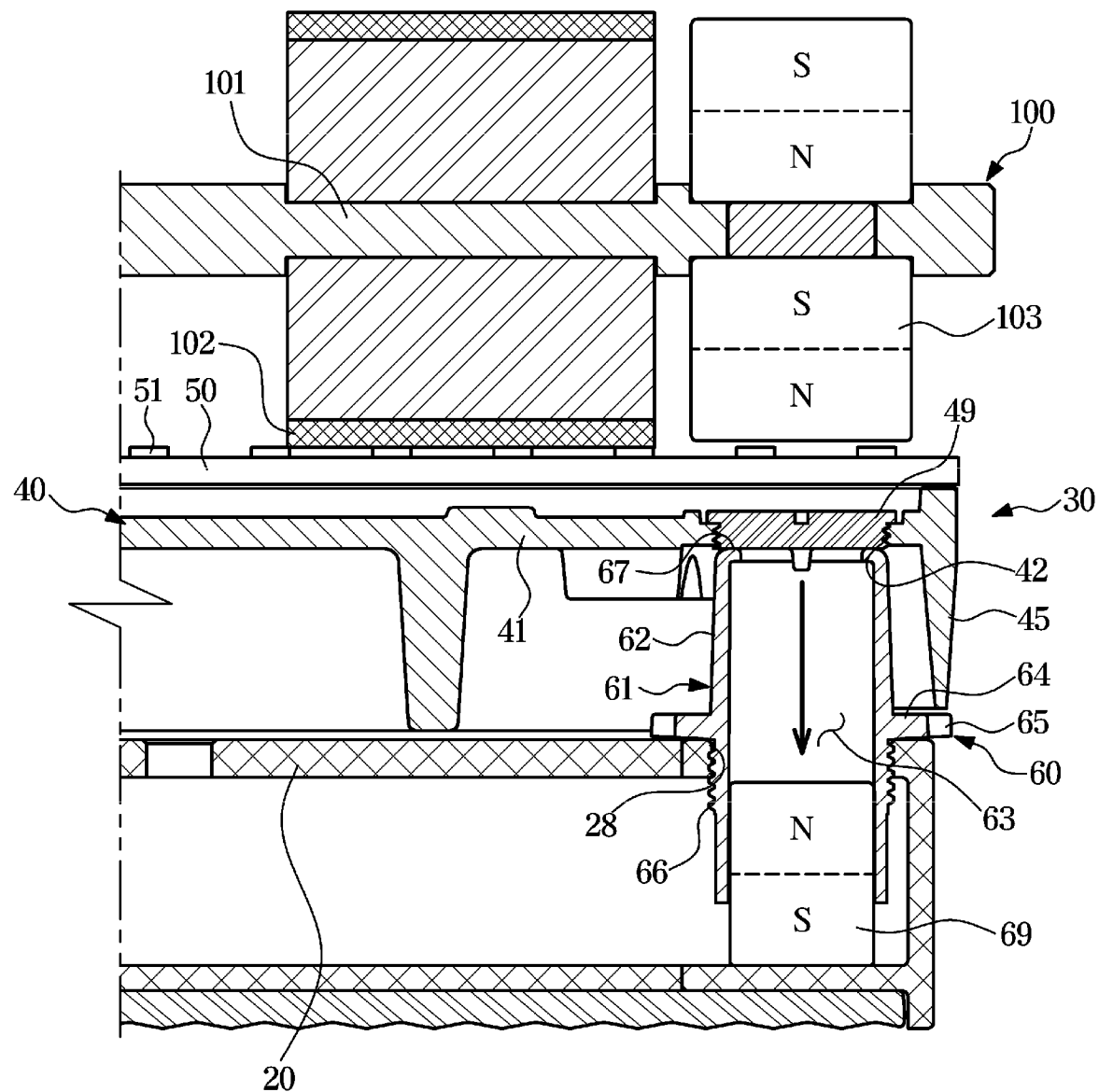
Figure 13:
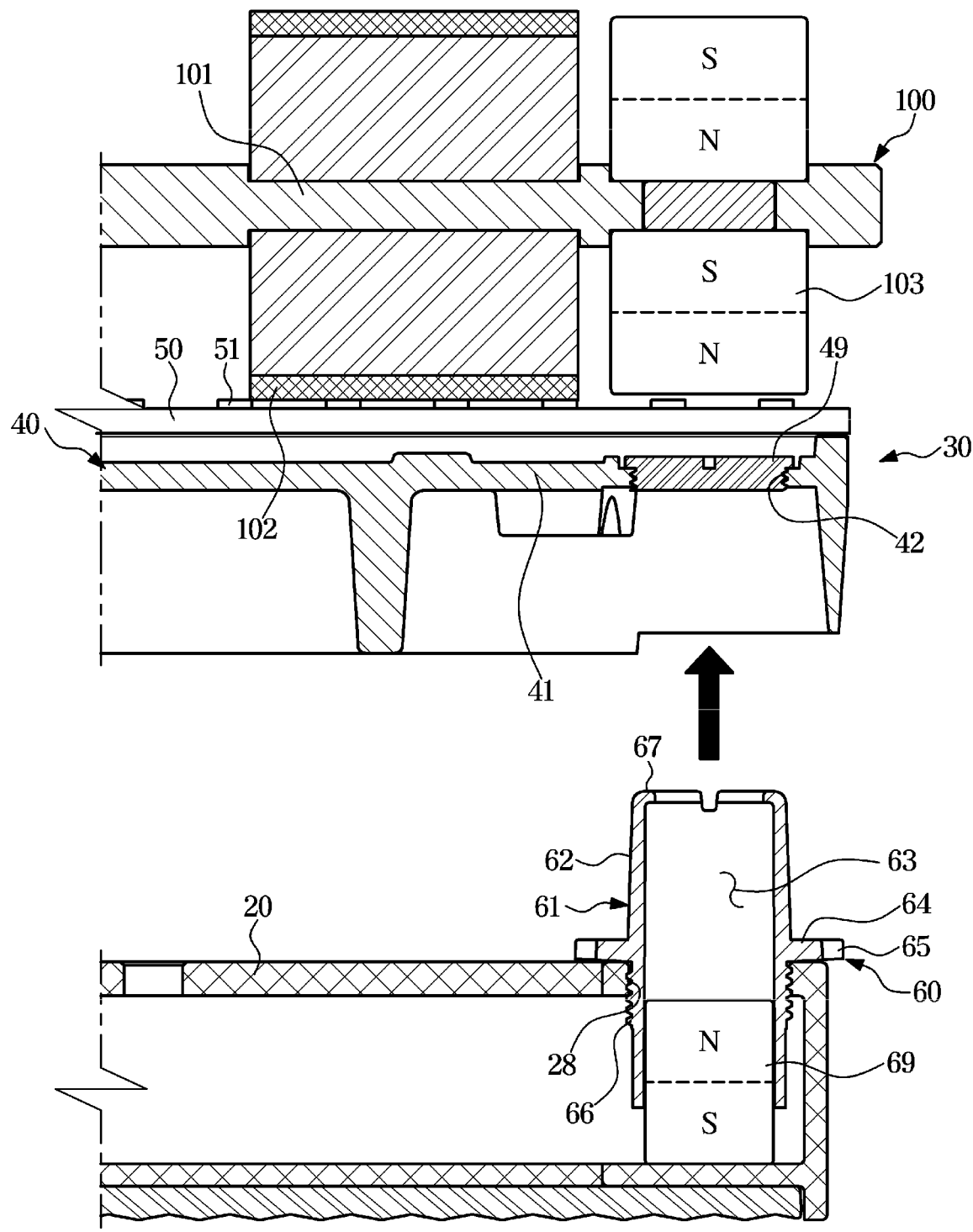

FIGS. 8, 9, and 10 are views illustrating an operation in which the frame and the display module are coupled to each other according to an embodiment. FIGS. 11, 12, and 13 are views illustrating an operation in which the frame and the display module are separated from each other according to an embodiment.

An example of an operation of coupling and separation of the frame and the display module according to an embodiment will be described with reference to FIGS. 8, 9, 10, 11, 12, and 13.

A coupling tool 100 may include a tool body 101 and a tool magnet 103 mounted on the tool body 101. The coupling tool 100 may have a size corresponding to a size of the display module 30. The tool magnet 103 may be provided as many as the number of studs 49 of the display module 30, and the tool magnet 103 may be placed at a position corresponding to the positions of the studs 49.

When the coupling tool 100 is moved toward the front of the display module 30, a stud 49 may be magnetized by the magnetic force of a tool magnet 103.

The coupling tool 100 may further include a shock absorbing member 102 to protect the display module 30. Upon the movement of the coupling tool 100 toward the front of the display module 30, the shock absorbing member 102 may mitigate an impact applied to the substrate 50 and prevent the tool magnet 103 from being in contact with the light emitting element 51. The shock absorbing member 102 may be formed of urethane, silicone, or rubber.

An example of an operation of coupling of the frame 20 and the display module 30 may proceed as follows.

As illustrated in FIG. 8, when a front part of the magnet 69 of the magnetic coupling device 60 has the N pole and a rear part thereof has the S pole, a front part of the tool magnet 103 of the coupling tool 100 may have the N pole and a rear part thereof may have the S pole. When the polarity of the magnet 69 of the magnetic coupling device 60 is reversed, the polarity of the tool magnet 103 of the coupling tool 100 may be reversed.

The stud 49 may be magnetized such that the front part thereof has the N pole and the rear part thereof has the S pole, when the coupling tool 100 in which the rear part thereof has the S pole is moved to the front of the display module 30.

As illustrated in FIG. 9, the display module 30, in which the stud 49 is magnetized, is moved to the front of the frame 20. Because the rear part of the stud 49 is magnetized as the S pole and the front part of the magnet 69 of the magnetic coupling device 60 has the N pole, the magnetic attraction force is applied between the stud 49 and the magnet 69.

By the magnetic attraction force between the stud 49 and the magnet 69, the magnet 69 is moved forward inside the holder 61, and thus the magnetic attraction force between the stud 49 and the magnet 69 may be increased. The magnet 69 may be moved to the supporter 67 of the holder 61, but the magnet 69 may be not in contact with the stud 49 by the supporter 67.

As illustrated in FIG. 10, the coupling tool 100 may be separated from the display module 30. Although the coupling tool 100 is separated from the display module 30, the magnetic attraction force is still applied between the stud 49 of the display module 30 and the magnet 69 of the magnetic coupling device 60, and thus the frame 20 may be maintained in a state of being coupled to the display module 30.

An example of an operation of separation of the frame 20 from the display module 30 may proceed as follows.

As illustrated in FIG. 11, the coupling tool 100 may be turned over to make the N pole directed to the display module 30, and then the coupling tool 100 is moved to the display module 30.

As illustrated in FIG. 12, by the magnetic force of the tool magnet 103 of the coupling tool 100, the stud 49 may be magnetized such that the front part thereof has the S pole and the rear part thereof has the N pole. Accordingly, the magnetic repulsion force may be applied between the stud 49 and the magnet 69. Therefore, the magnet 69 may be moved backward inside the holder 61.

As illustrated in FIG. 13, when the coupling tool 100 is separated from the frame 20, the display module 30 may be separated from the frame 20 together with the coupling tool 100.

FIGS. 14, 15, 16, and 17 are views illustrating an operation in which a position of the display module with respect to the frame is adjusted by rotating an adjustment device according to an embodiment.

An example of an operation in which the position of the display module with respect to the frame is adjusted by rotating the adjustment device according to an embodiment will be described with reference to FIG. 14 FIG. 17.

Figure 14:
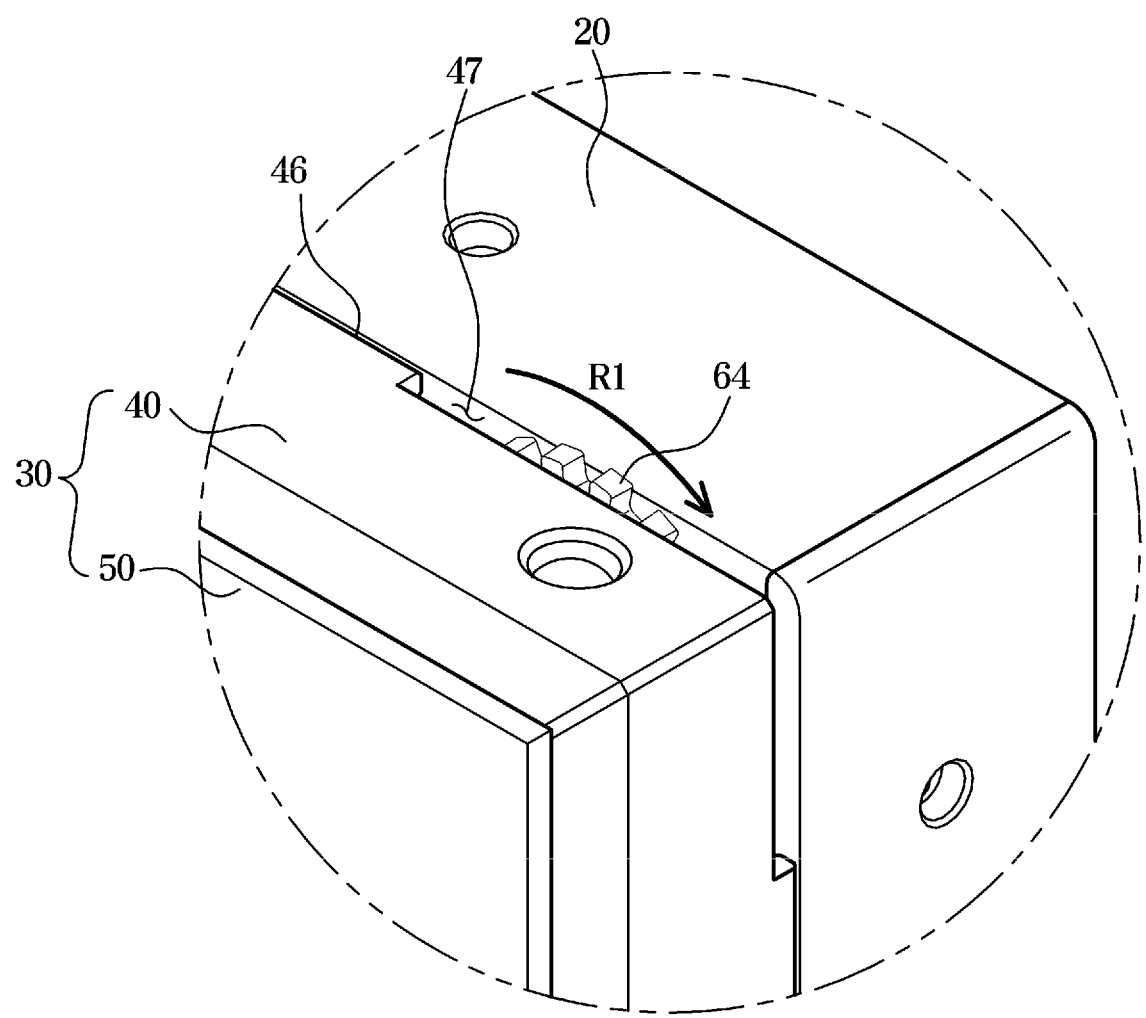
FIGS. 14, 15, 16, and 17 are views illustrating an operation in which a position of the display module with respect to the frame is adjusted by rotating an adjuster according to an embodiment.

As illustrated in FIG. 14, the adjustment device 64 is rotated in a direction R1 to adjust the position of the display module 30 with respect to the frame 20. At least a part of the adjustment device 64 is exposed to the outside of the display apparatus 1 so that it is possible to rotate the adjustment device 64 without disassembling the display apparatus 1, with the hand, even after the assembly and installation of the display apparatus 1 is completed.

Figure 15:
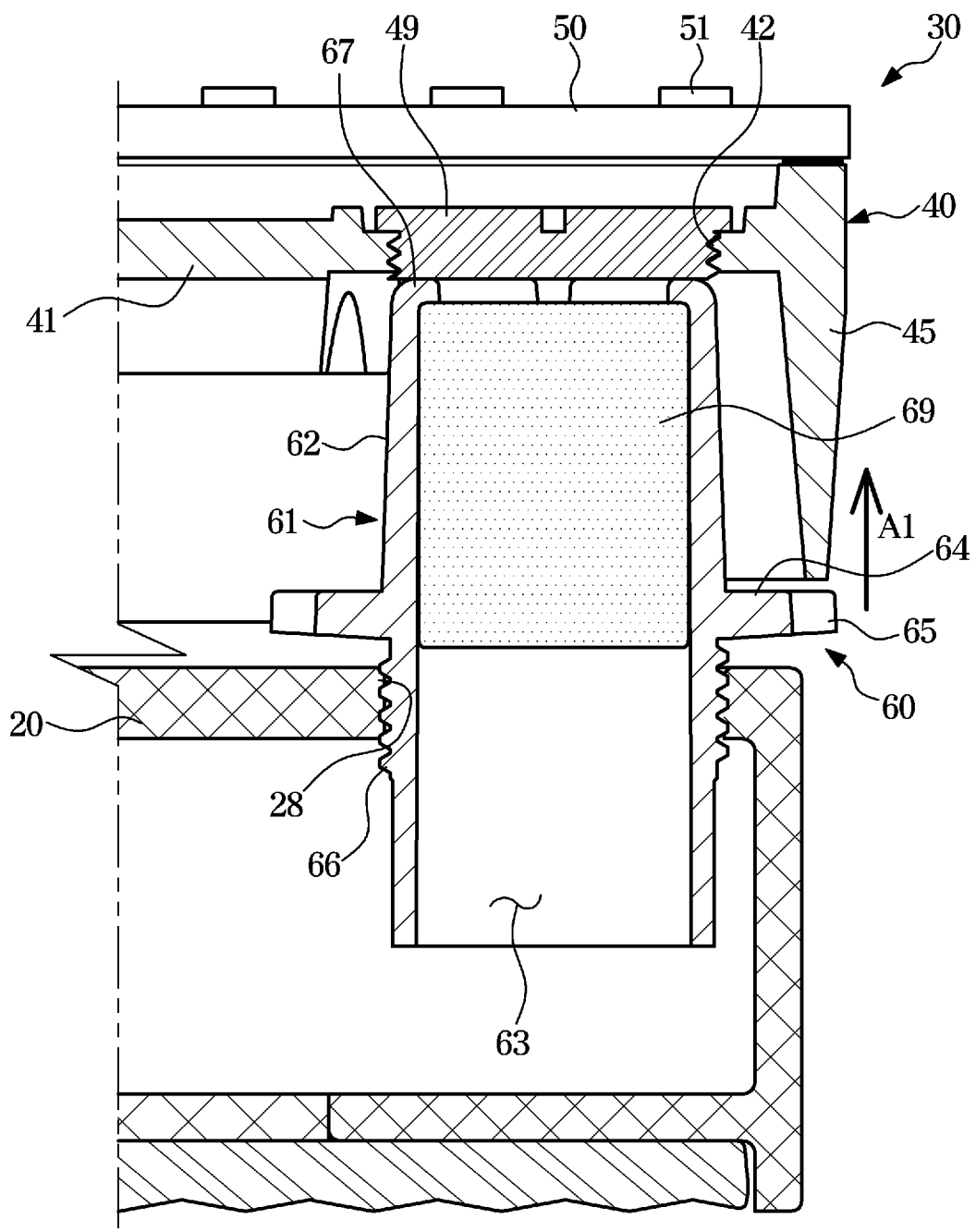

As illustrated in FIG. 15, the depth of the screw connection between the holder 61 and the frame 20 may be adjusted, as the holder 61 is rotated by rotating the adjustment device 64. That is, the holder 61 may be moved forward in a direction A1 with respect to the frame 20. The display module 30 adheres to the supporter 67 of the holder 61 by the magnetic attraction force of the magnet 69, and thus when the holder 61 is moved forward, the display module 30 may be also moved forward, thereby adjusting the position of the display module 30.

Figure 16:
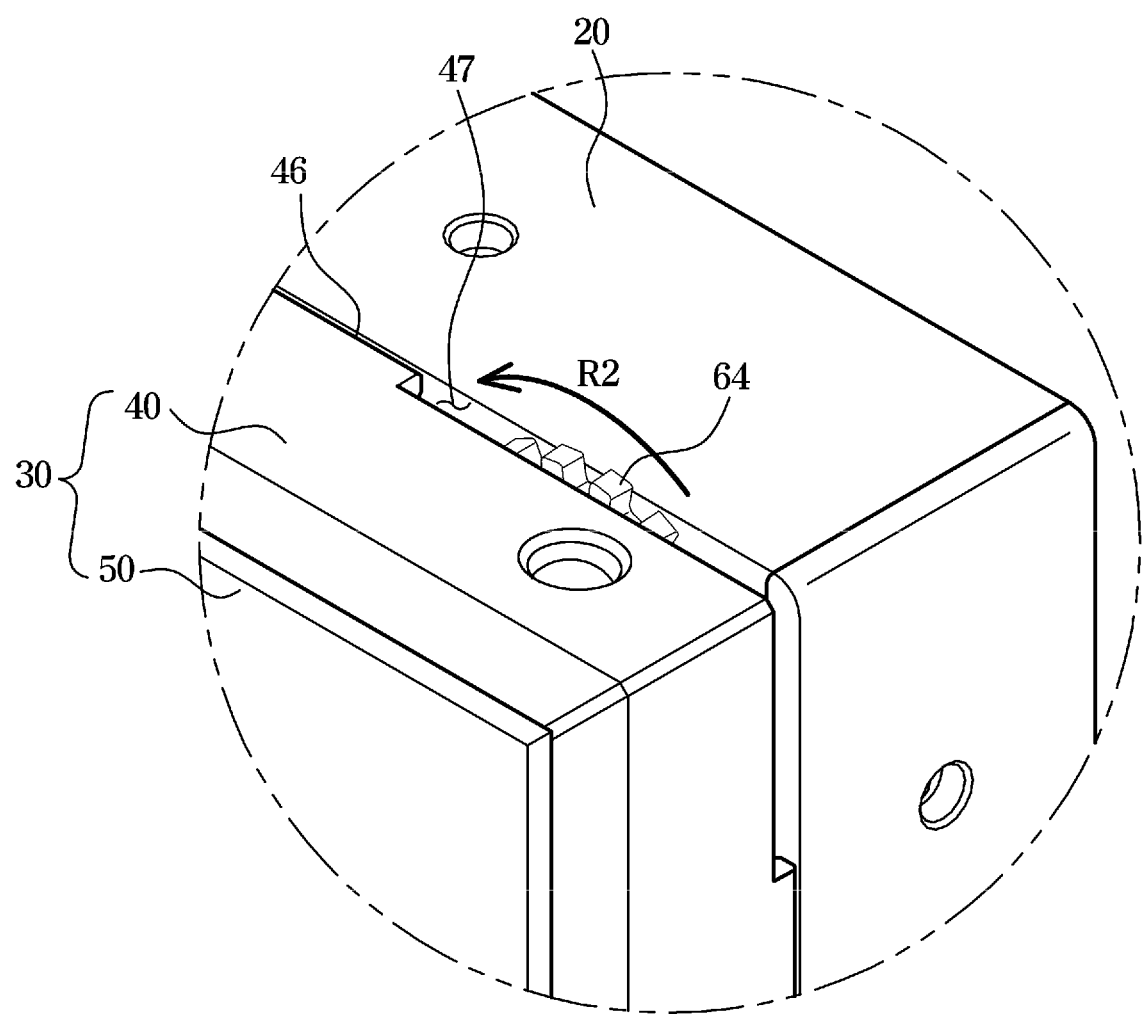

As illustrated in FIG. 16, the adjustment device 64 is rotated in an opposite direction R2.

Figure 17:
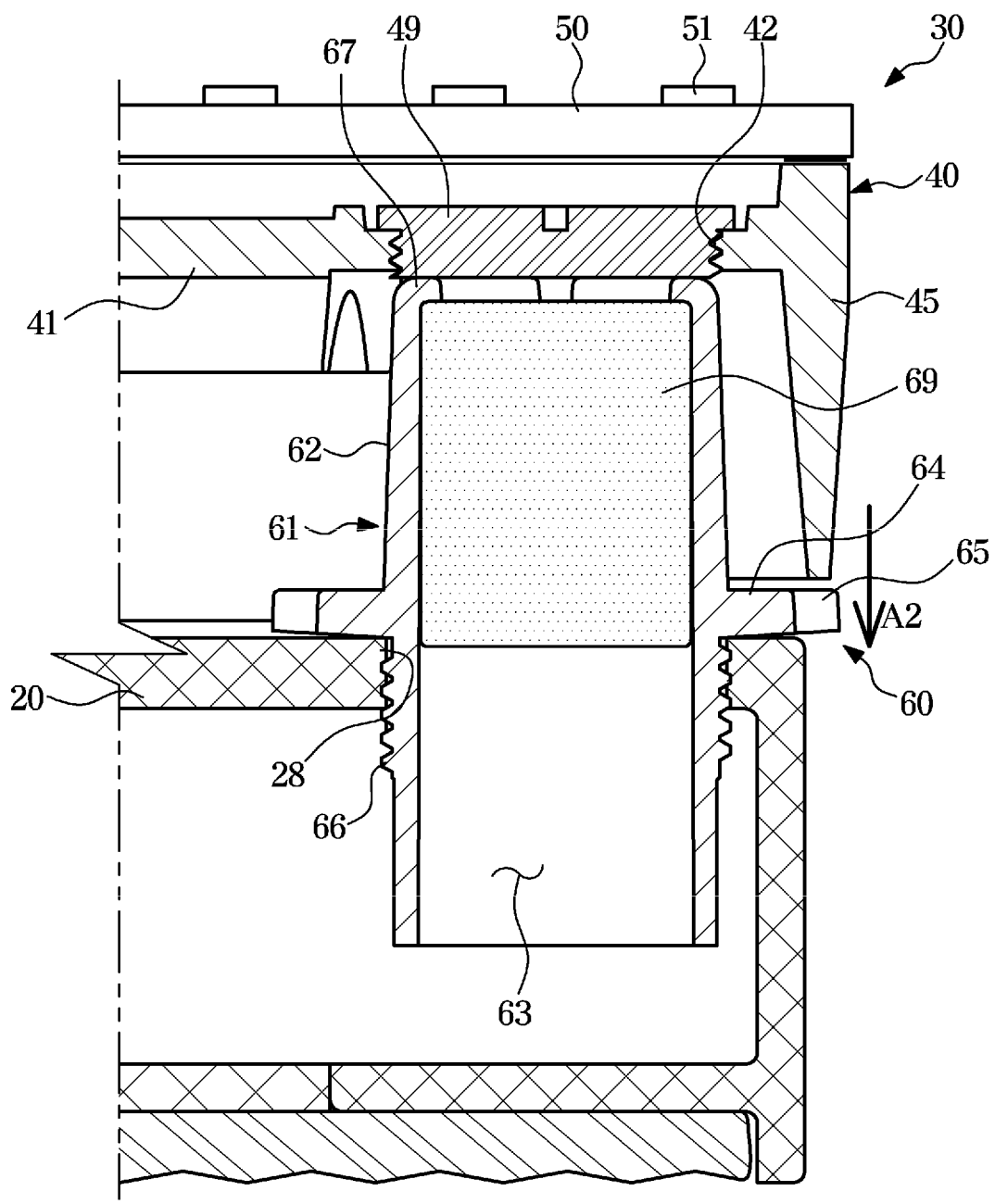

As illustrated in FIG. 17, the depth of the screw connection between the holder 61 and the frame 20 may be adjusted, as the holder 61 is rotated by rotating the adjustment device 64. That is, the holder 61 may be moved backward in a direction A2 with respect to the frame 20. The display module 30 adheres to the supporter 67 of the holder 61 by the magnetic attraction force of the magnet 69, and thus when the holder 61 is moved backward, the display module 30 may be also moved backward, thereby adjusting the position of the display module 30.

Figure 18:
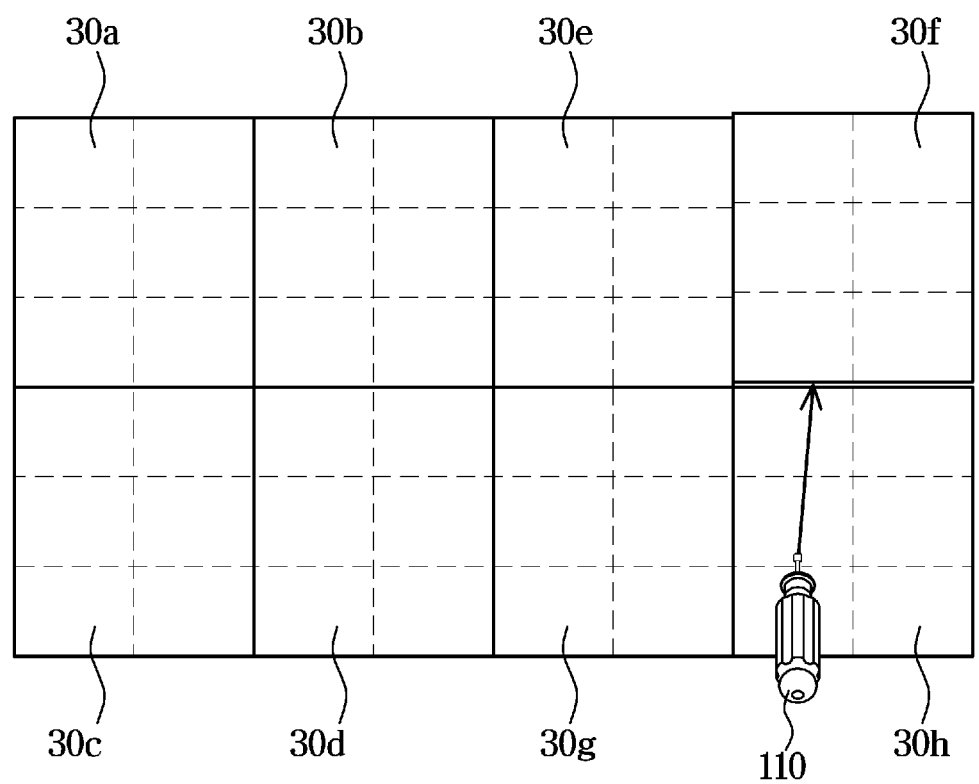
FIGS. 18, 19, and 20 are views illustrating an operation of rotating the adjuster by using a tool when the adjuster of the display module is covered by other display module, which is adjacent thereto, according to an embodiment.
Figure 19:
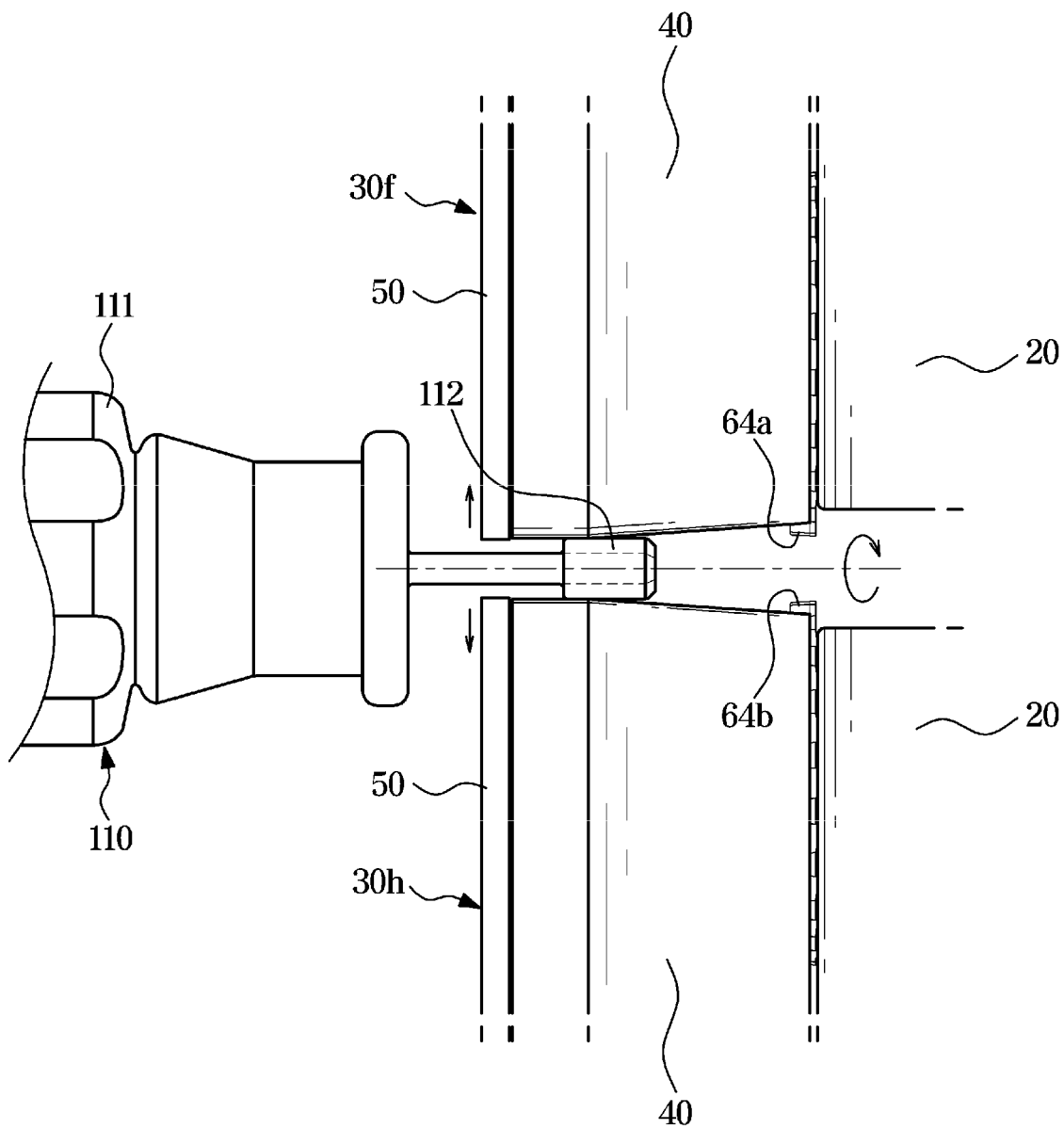
Figure 20:
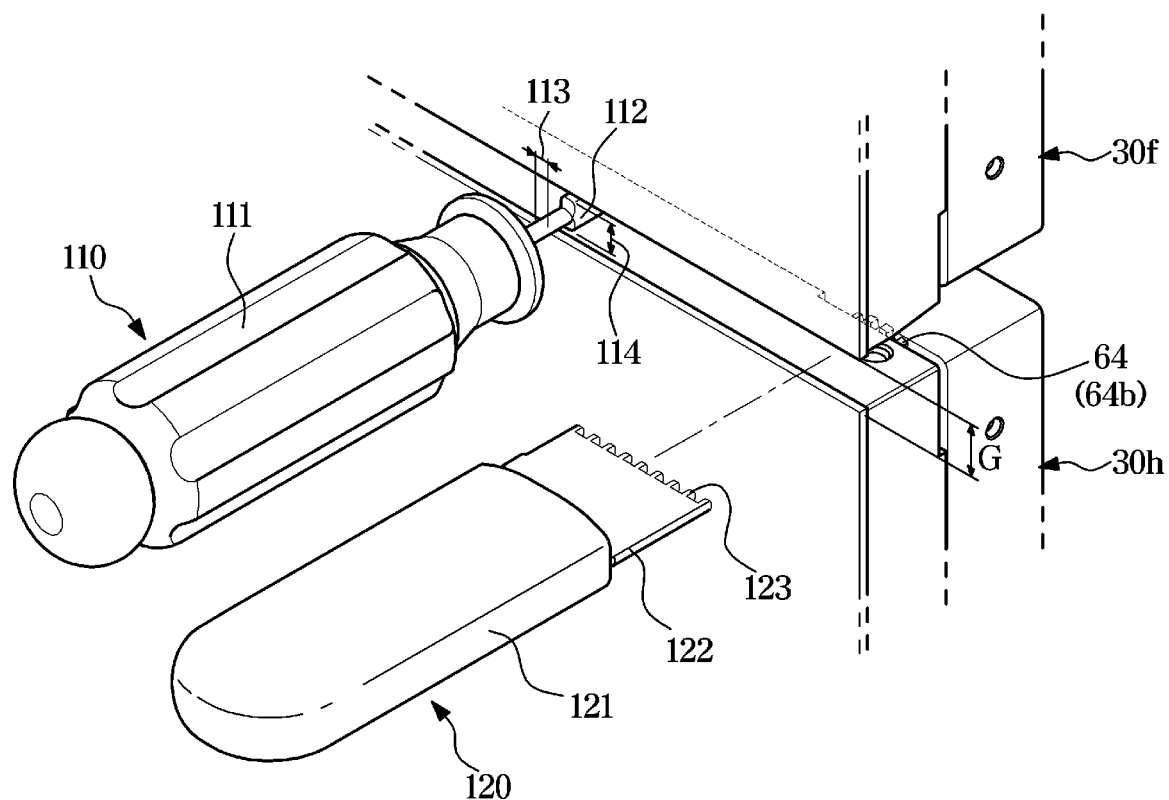

FIGS. 18, 19, and 20 are views illustrating an operation of rotating the adjustment device by using a tool when the adjustment device of the display module is covered by other display module, which is adjacent thereto, according to an embodiment.

An example of an operation of rotating an adjustment device 64b using tools, for example gap securing tool 110 and adjustment tool 120, in a case in which it is difficult to adjust the rotation of the adjustment device 64b with the hand because the adjustment device 64b of a display module 30h is covered by another adjacent display module 30f, will be described with reference to FIG. 18 through FIG. 20.

As described above, the display apparatus 1 according to an embodiment includes a plurality of display modules 30a to 30h, and the plurality of display modules 30a to 30h may be adjacent to each other in the up-down direction, illustrated as the Y-axis direction, and/or in the left-right direction, illustrated as the X-axis direction.

As illustrated in FIGS. 18, 19, and 20, because the adjustment device 64b provided in the upper side of the display module 30h is covered by the display module 30f disposed adjacent to the upper portion of the display module 30h, it may be difficult to rotate the adjustment device 64b with the hand. On the contrary, because the adjustment device 64a provided in the lower side of the display module 30f is covered by the display module 30h disposed adjacent to the lower portion of the display module 30f, it may be difficult to rotate the adjustment device 64a with the hand. In this case, the adjustment devices 64a and 64b may be rotated using tools, for example gap securing tool 110 and adjustment tool 120.

Tools may include a gap securing tool 110 configured to secure a gap G between the display module 30f and the display module 30h, and an adjustment tool 120 configured to rotate the adjustment device 64a and 64b by engaging with the serrated portion of the adjustment device 64a and 64b.

The gap securing tool 110 may include a handle 111 and an insertion portion 112 extending to be inserted between the display modules 30f and 30h. The cross section of the insertion portion 112 may include a short side 113 having a thickness thin enough to be inserted between the display modules 30f and 30h, and a long side 114 having a thickness greater than the short side 113 to be inserted into and then to increase the gap G between the display modules 30f and 30h.

By using the above mentioned configuration, it may be possible to secure the gap G between the display modules 30f and 30h by inserting the insertion portion 112 of the gap securing tool 110 and then rotating the gap securing tool 110.

The adjustment tool 120 may include a handle 121 and an engaging portion 122 extending to be engaged with the adjustment device 64. The engaging portion 122 may be provided with a toothed portion by corresponding to the serrated portion of the adjustment device 64. The gap G between the display modules 30f and 30h may be secured by the gap securing tool 110 and then the adjustment tool 120 may be inserted into the gap G so as to rotate the adjustment device 64. When it is not required to secure the gap, only the adjustment tool 120 may be used.

As mentioned above, although it is difficult to directly operate the adjustment device because the adjustment device of the display module is covered by other adjacent display modules, it may be possible to adjust the position of the display module by using the tool, without disassembling the display apparatus.

Figure 21:
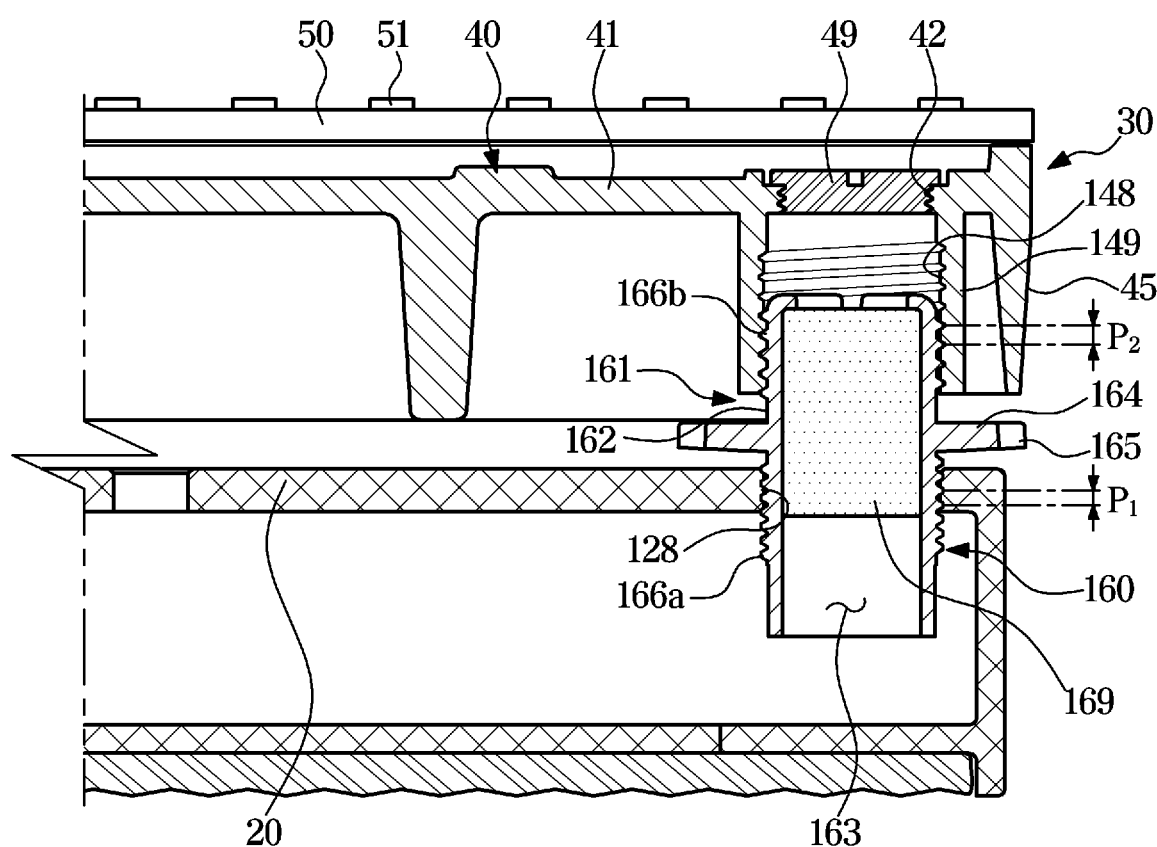
FIG. 21 is a view of a display apparatus according another embodiment to the disclosure.

FIG. 21 is a view of a display apparatus according an embodiment to the disclosure. The same reference numerals are assigned to the same components as those of the above-described embodiment, and description thereof may be omitted.

According to an embodiment, the frame 20 and the display module 30 may be coupled to each other by using the magnetic force of the magnetic coupling device 60 and the position of the display module 30 with respect to the frame 20 may be adjusted by the adjustment device 64 of the holder 61 forming the magnetic coupling device 60. That is, the holder 61 may be screwed to the frame 20 so as to adjust the depth of the screw connection of the holder 61, thereby adjusting the position of the display module 30.

In an embodiment, a holder 161 may be screwed to both sides of a frame 20 and a display module 30. That is, the holder 161 may include a first male thread 166a screwed to the frame 20 and a second male thread 166b screwed to the bracket 40 of the display module 30.

The holder 161 includes a cylindrical portion 162 having a hollow 163 configured to receive a magnet 269, and the first male thread 166a and the second male thread 166b may be formed on an outer circumferential surface of the cylindrical portion 162.

A holder mounting hole 128 in which the holder 161 is installed may be formed in the frame 20, and on an inner circumferential surface of the holder mounting hole 128, a female thread to which the first male thread 166a is screwed may be formed. A screw coupling portion 149 protruding rearward from the bracket body 41 may be formed on the bracket 40 to allow the holder 161 to be installed thereon. The screw coupling portion 149 may include a screw coupling hole 148 and on an inner circumferential surface of the screw coupling hole 148, a female thread to which the second male thread 166b is screwed may be formed. The first male thread 166a may be formed such that crest and root are repeated with a constant pitch P1 in the longitudinal direction. The second male thread 166b may be formed such that crest and root are repeated with a constant pitch P2 in the longitudinal direction.

The pitch P1 of the first male thread 166a and the pitch P2 of the second male thread 166b may be different from each other. For example, the pitch P1 of the first male thread 166a may have about 0.6 mm, and the pitch P2 of the second male thread 166b may have about 0.7 mm.

Therefore, when the holder 161 is rotated once, the frame 20 screwed to the first male thread 166a may be moved about 0.6 mm, and the display module 30 screwed to the second male thread 166b may be moved about 0.7 mm. That is, based on one time rotation of the holder 161, a relative position between the frame 20 and the display module 30 may be widened or closed by about 0.1 mm. Because the holder 161 has a double pitch thread, the relative positions of the frame 20 and the display module 30 may be finely adjusted.

In the same manner as the above mentioned embodiment, the holder 161 may include an adjustment device 164 protruding radially outward from the cylindrical portion 162 to rotate the holder 161.

The adjustment device 164 may be formed along the circumference of the outer circumferential surface of the cylindrical portion 162. At the radially outer end of the adjustment device 164, a serrated portion 165 having the concave-convex pattern may be formed to easily rotate the adjustment device 164. At least a part of the adjustment device 164 may be exposed to the outside of the display apparatus. Therefore, after the installation of the display apparatus, it may be possible to adjust the position of the display module 30 without disassembling the display apparatus, again.

As is apparent from the above description, it is possible to easily adjust a difference in height among a plurality of display modules installed in a frame.

It is possible to easily adjust a difference in height among a plurality of display modules without disassembling the display apparatus after the installation of the display apparatus.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
   a frame;
   a display module comprising at least one substrate on which a plurality of light emitting elements is mounted, and a bracket to which the at least one substrate is attached; and
   a magnetic coupling device comprising a holder fastened to the frame and configured to support the display module, and a magnet received in the holder and configured to apply a magnetic attraction force to pull the display module,
   wherein the holder comprises a cylindrical portion having a hollow configured to receive the magnet and an adjustment device configured to adjust a position of the display module with respect to the frame while the display module is supported by the frame, and
   wherein a radial portion of the adjustment device protrudes radially outward from the cylindrical portion such that at least a part of the radial portion of the adjustment device is exposed to an outside of the display apparatus.

2. The display apparatus of claim 1, wherein the display module is coupled to a front side of the frame, and
   wherein the adjustment device is further configured to adjust the position of the display module with respect to the frame, in a frontward direction or a rearward direction.

3. The display apparatus of claim 1, wherein the adjustment device is further configured to move the display module forward or rearward due to rotation of the adjustment device clockwise or counterclockwise.

4. The display apparatus of claim 1, wherein the holder comprises a male thread on an outer circumferential surface of the cylindrical portion, and
   wherein the male thread is configured to be screwed to the frame.

5. The display apparatus of claim 1, wherein the adjustment device comprises a serrated portion provided at a radially outer end of the adjustment device.

6. The display apparatus of claim 1, wherein the bracket comprises an edge wall provided on an edge of a back surface of the bracket and configured to protrude toward the frame side, and
   wherein the bracket comprises a slot provided on the edge wall to expose the adjustment device to an outside of the edge wall.

7. The display apparatus of claim 6, wherein the slot is recessed from a rear end portion of the edge wall.

8. The display apparatus of claim 1, wherein the display module is held against the holder by the magnetic attraction force of the magnet.

9. The display apparatus of claim 1, wherein the bracket comprises a bracket body and a stud coupled to the bracket body, and
   wherein the stud is configured to magnetically interact with the magnet.

10. The display apparatus of claim 9, wherein the stud is held against the holder by the magnetic attraction force between the magnet and the stud while the display module is supported by the frame.

11. The display apparatus of claim 1, further comprising a plurality of magnetic coupling devices, including the magnetic coupling device, positioned at a plurality of corners of the bracket.

12. The display apparatus of claim 1, further comprising a plurality of display modules, including the display module, positioned in a left-right direction or an up-down direction of the display apparatus.

13. The display apparatus of claim 1, wherein the holder comprises a first male thread configured to be screwed to the frame and a second male thread configured to be screwed to the bracket, and wherein a pitch of the first male thread is different from a pitch of the second male thread.

14. The display apparatus of claim 1, wherein the cylindrical portion and the adjustment device are integrally formed in a single unit.

15. A display apparatus comprising:

a frame;

a display module comprising at least one substrate on which a plurality of light emitting elements is mounted, and a bracket to which the at least one substrate is attached;

a holder fastened to the frame and configured to support the display module; and a magnet configured to attach the display module to the holder by a magnetic attraction force while the display module is supported by the frame, wherein the holder comprises a cylindrical portion comprising a male thread configured to be screwed into the frame, and wherein the cylindrical portion comprises an adjustment device having a radial portion that that protrudes radially outward from the cylindrical portion such that at least a part of the radial portion of the adjustment device is exposed to an outside of the display apparatus and is configured to adjust a depth to which the holder is inserted into the frame.

16. The display apparatus of claim 15, wherein at least a part of the adjustment device extends through a slot provided between the display module and the frame.

17. The display apparatus of claim 15, wherein the cylindrical portion comprises a hollow configured to receive the magnet.

18. The display apparatus of claim 15, wherein the holder comprises a supporter configured to support the display module.

19. A display apparatus comprising:

a display module comprising a magnetizable stud;

a frame comprising a mounting hole, wherein the mounting hole comprises a first thread is provided on an inner surface; and a magnetic coupling device comprising:

a holder comprising a cylindrical portion and a second thread provided on an outer surface of the cylindrical portion, wherein the second thread is configured to engage the first thread when the holder is inserted into the mounting hole;

an adjustment device configured to adjust a depth to which the holder is inserted into the mounting hole by adjusting an amount of engagement between the first thread and the second thread, wherein a radial portion of the adjustment device protrudes radially outward from the cylindrical portion such that at least a part of the radial portion of the adjustment device is exposed to an outside of the display apparatus;

a magnet disposed within the holder, wherein the magnet is configured to magnetize the magnetizable stud to attract the magnetizable stud using a magnetic attraction force while the holder is in contact with the magnetizable stud, wherein the holder is configured to support the display module while the holder is in contact with the magnetizable stud, and wherein the adjustment device is configured to adjust a position of the display module with respect to the frame while the display module is supported by the frame.

20. The display apparatus of claim 19, wherein the display module is configured to be coupled to the frame using a coupling tool, wherein the coupling tool comprises a first portion having a first magnetic polarity and a second portion having a second magnetic polarity opposite to the first magnetic polarity, wherein the coupling tool is configured to magnetize the magnetizable stud so that the magnetizable stud attracts the magnet while the first portion is in contact with the display module, and wherein the coupling tool is configured to magnetize the magnetizable stud so that the stud repels the magnet while the second portion is in contact with the display module.

* * * * *